United States Patent [19]
Jackson

[11] Patent Number: 5,943,783
[45] Date of Patent: *Aug. 31, 1999

[54] METHOD AND APPARATUS FOR DETERMINING THE ALIGNMENT OF MOTOR VEHICLE WHEELS

[75] Inventor: Bernie Fergus Jackson, Los Gatos, Calif.

[73] Assignee: Balco, Incorporated, San Jose, Calif.

[ * ] Notice: This patent is subject to a terminal disclaimer.

[21] Appl. No.: 08/982,814

[22] Filed: Dec. 2, 1997

Related U.S. Application Data

[63] Continuation of application No. 08/544,378, Oct. 10, 1995, Pat. No. 5,724,743, and a continuation-in-part of application No. 08/122,550, Sep. 29, 1993, Pat. No. 5,535,522, which is a continuation-in-part of application No. 07/940,935, Sep. 4, 1992, abandoned.

[51] Int. Cl.⁶ .................................................. G01B 11/275
[52] U.S. Cl. ........................... 33/288; 33/203.18; 356/155
[58] Field of Search .............................. 33/288, 286, 203, 33/203.18, 203.19, 203.2; 356/155, 139.09, 152.1, 152.2, 153.3

[56] References Cited

U.S. PATENT DOCUMENTS

| | | | |
|---|---|---|---|
| 4,180,915 | 1/1980 | Lill et al. ................................... | 33/228 |
| 5,532,816 | 7/1996 | Spann et al. .......................... | 33/203.19 |
| 5,535,522 | 7/1996 | Jackson ..................................... | 33/288 |
| 5,724,128 | 3/1998 | January .............................. | 356/139.09 |
| 5,724,743 | 3/1998 | Jackson ..................................... | 33/288 |

FOREIGN PATENT DOCUMENTS 2948573  6/1981  Germany ................................. 33/288

*Primary Examiner*—Christopher W. Fulton
*Attorney, Agent, or Firm*—McDermott, Will & Emery

[57] ABSTRACT

An apparatus for determining the position and/or alignment of objects such as motor vehicle wheels, and including targets for attachment to the objects, a pair of optical sensing means such as television cameras for viewing the targets, an electronic processing means connected to the optical sensing means for processing data relating to images of the targets to determine position and/or alignment information, and a display means for displaying the position and/or alignment information. The optical sensing means view a target located on each object and form an image of each target. Electronic signals corresponding to each of the images are transferred to the electronic processing means which correlates the image signals of each of the targets with the true shape of each target. In so doing, the processing means relates the geometric characteristics and positional interrelationships of certain known elements of the target with the geometric characteristics and positional interrelationships of corresponding elements in the viewed images and calculates the position and/or alignment of the objects to which the targets are attached.

24 Claims, 10 Drawing Sheets

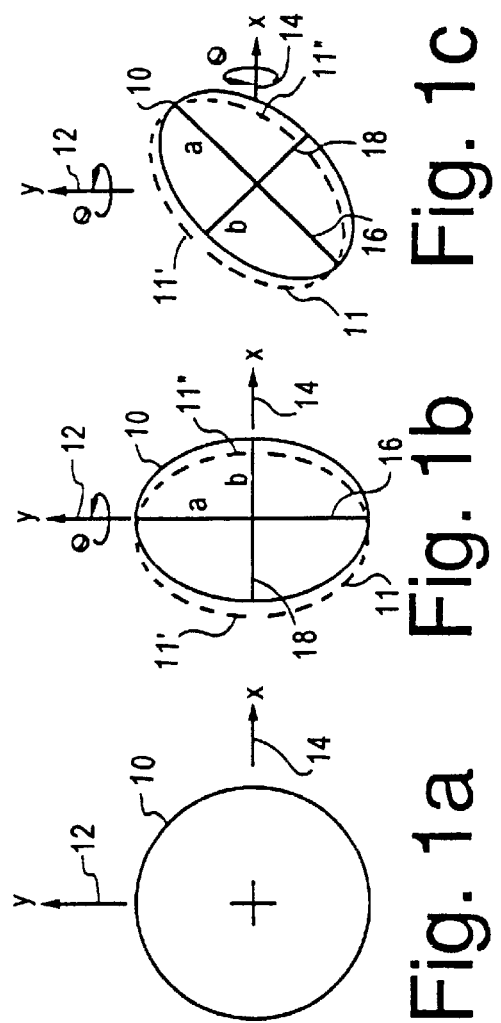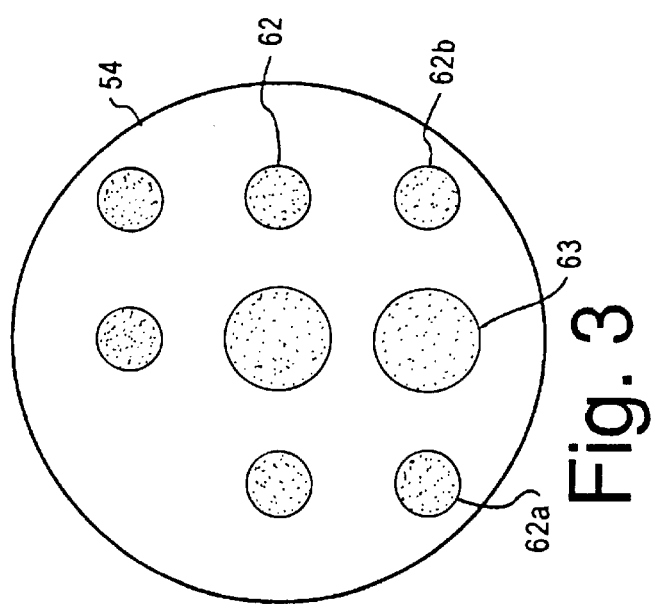

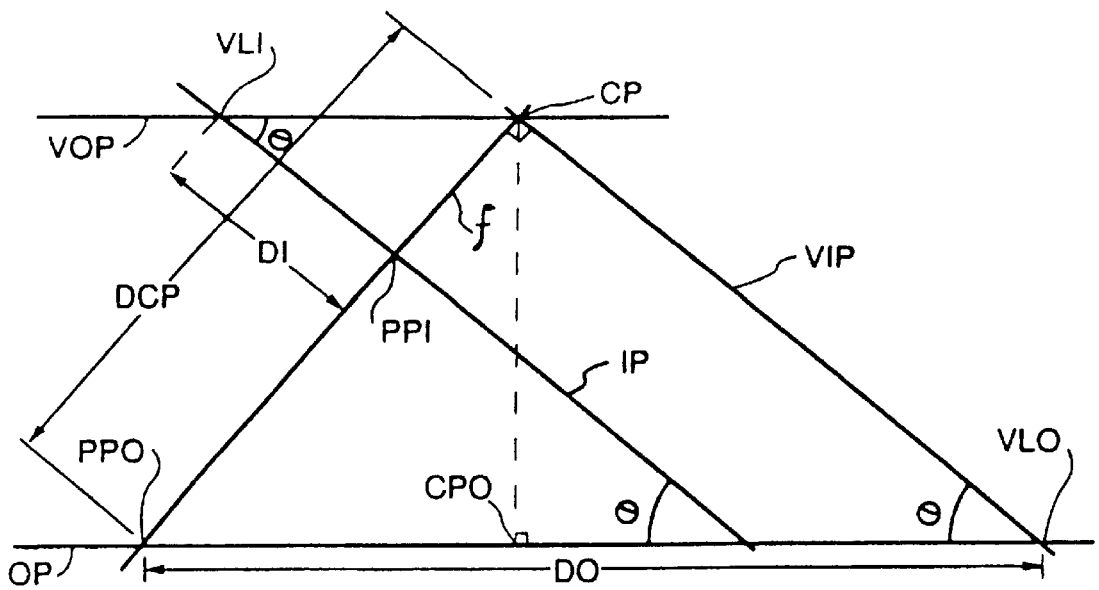
Fig. 8a
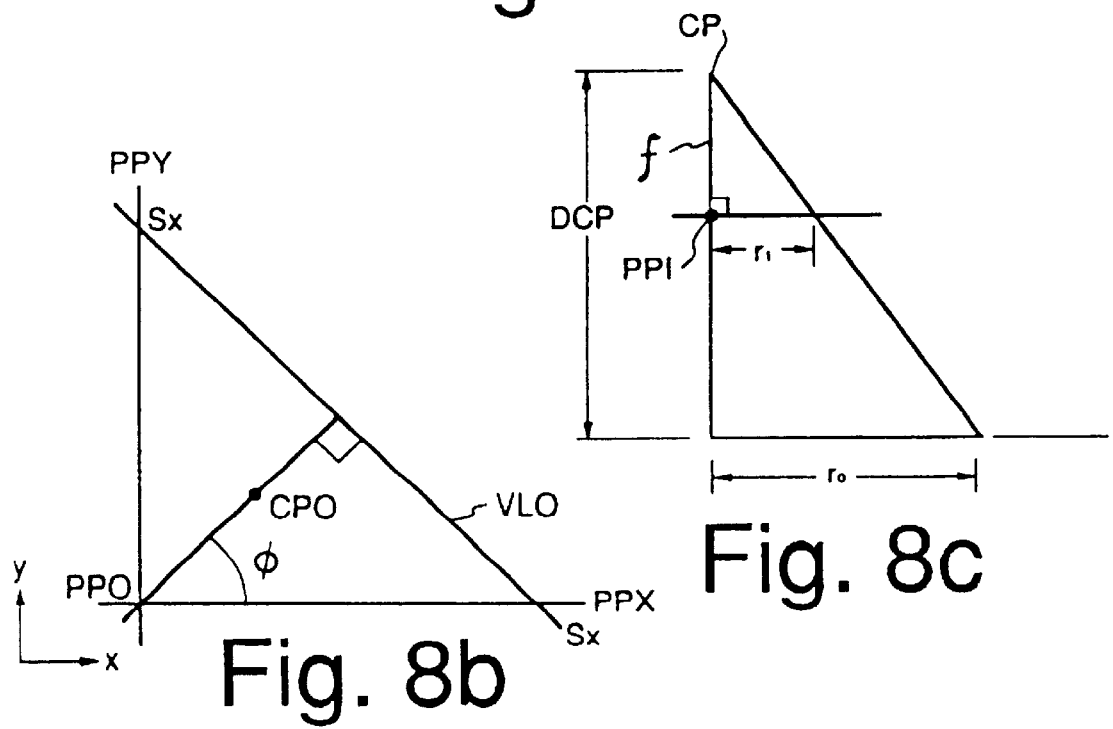
Fig. 8b
Fig. 8c

Fig. 10
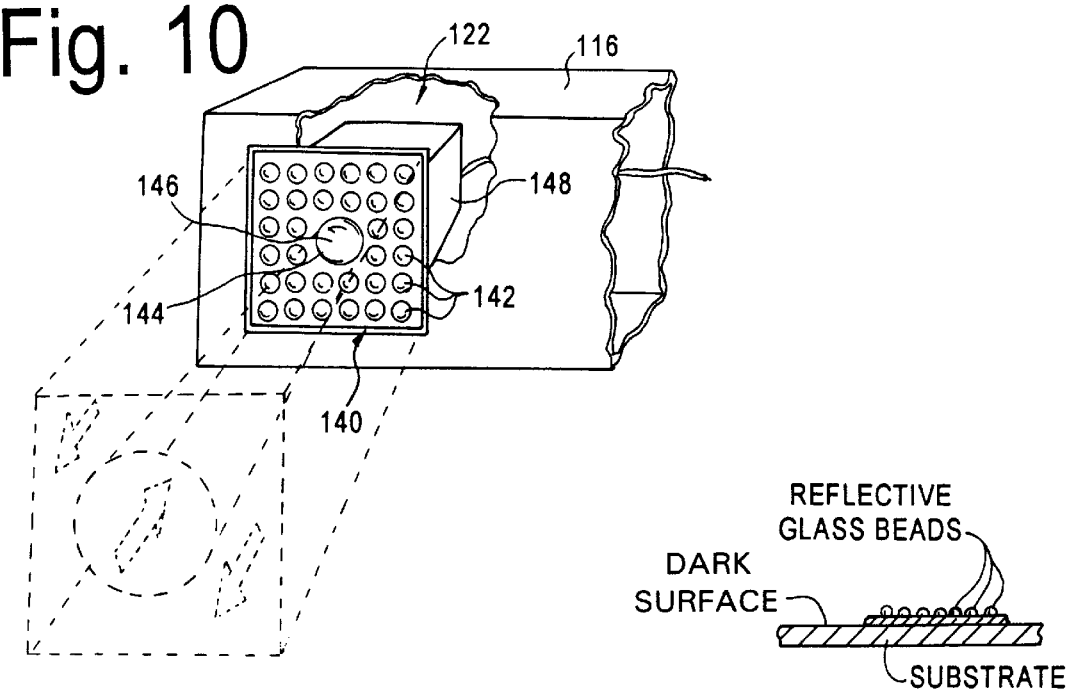
Fig. 11a
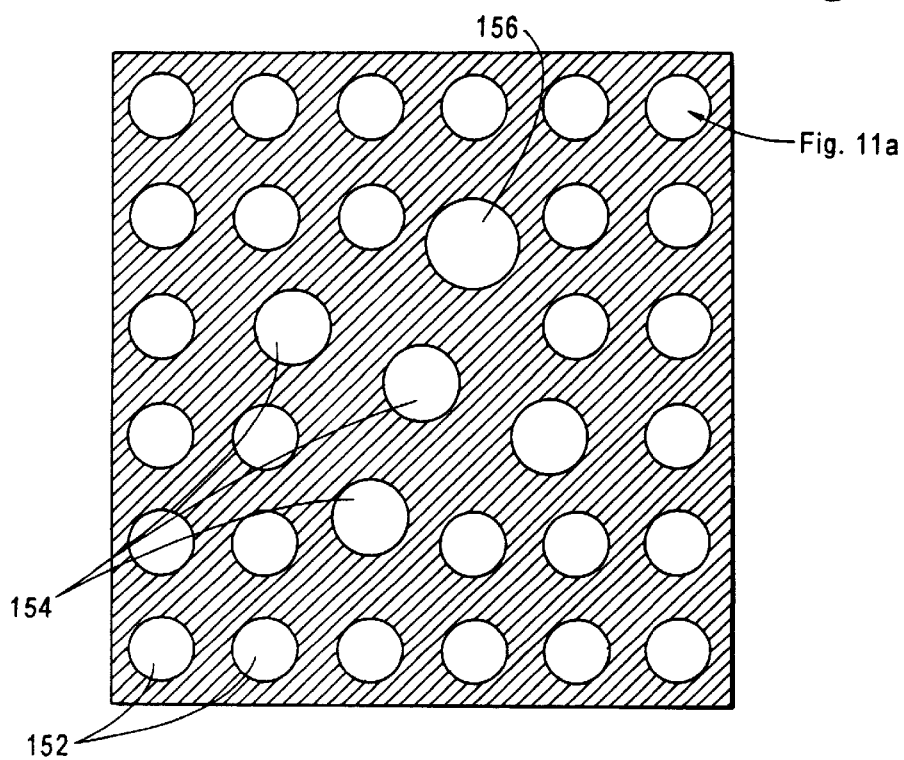
Fig. 11

METHOD AND APPARATUS FOR DETERMINING THE ALIGNMENT OF MOTOR VEHICLE WHEELS

REFERENCE TO RELATED APPLICATIONS

This application is a continuation of U.S. application Ser. No. 08/544,378 filed Oct. 10, 1995, now U.S. Pat. No. 5,724,743, which is a continuation-in-part of U.S. Ser. No. 08/122,550 filed Sep. 29, 1993, now U.S. Pat. No. 5,535,522 which is a continuation-in-part of U.S. Ser. No. 07/940,935 filed Sep. 4, 1992, now abandoned, all of which are entitled "Method and Apparatus for Determining the Alignment of Motor Vehicle Wheels" and assigned to the assignee of the present invention, and relate to International Application No. PCT/US93/08333 filed Sep. 3, 1993, entitled "Method and Apparatus for Determining the Alignment of Motor Vehicle Wheels" also assigned to the assignee of the present invention.

BACKGROUND OF THE INVENTION

1. Field of the Invention

This invention relates to a method and apparatus for determining the alignment of motor vehicle wheels. More particularly, this invention relates to a method and apparatus including an opto-electronic image detector for detecting wheel orientation and producing electronic image data representing the wheels, or a reference mounted thereon, computational means for determining the alignment of the wheels, and means for comparing the electronic images, or data corresponding thereto, to previously stored alignment data and generating information which can be used to perform necessary adjustment to the vehicle.

2. Terms and Definitions

In the vehicle wheel alignment industry the following terms, with corresponding definitions, are commonly used:

Camber is the angle representing the inward or outward tilt from true vertical of the wheel and is positive if the top of the wheel tilts outward.

Caster is the angle representing the forward or rearward tilt from true vertical of the steering axis. When a wheel is viewed from the side, the angle is positive when the upper ball joint (or top of king pin, or upper mount of a McPherson strut) is rearward of the lower ball joint (or bottom of the king pin, or lower mount of a McPherson strut).

Thrust Line (T/L) is a line that bisects the angle formed by the rear toe lines. Lines and angles measured clockwise from the 12:00 axis are positive.

Geometric Center Line, is the line that runs from a point on the rear axle midway between the rear wheels to a point on the front axle midway between the front wheels.

Individual Toe is the angle formed by a front-to-back line through the wheel compared to the geometric center line. Angles pertaining to the left side are positive when clockwise of the thrust line and angles pertaining to the right side are positive when counterclockwise of the thrust line.

Offset is the amount that a front wheel and its corresponding rear wheel are out of line with each other. If there is no offset, the rear wheel is directly behind the front wheel.

Setback is the amount that one wheel on one side of the vehicle is displaced back from its corresponding wheel on the other side of the vehicle.

Steering Axis is a line projected from the upper pivot point of the upper ball joint or top of kingpin, or McPherson strut, through the lower ball joint.

Steering Axis Inclination (SAI) is the angle between the steering axis and true vertical. If the steering axis appears to tilt inward at the bottom of the wheel (as viewed from the driver position), the SAI is positive. SAI also is also known as kingpin inclination (KPI).

Thrust Angle (T/A) is the angle between the thrust line and the geometric center line. Angles measured clockwise from the geometric center line are positive.

Total Toe is the sum of individual, side-by-side toe measurements. If lines projected parallel to the primary planes of the wheels intersect at a point ahead of the side-by-side wheels, the angle is positive (toe in). If the lines would intersect behind the side to side wheels, the angle is negative (toe out). If the projected lines are parallel, the toe is zero.

Traditionally, the Camber and Toe measurements for each wheel of the vehicle are relative measurements i.e. relative to a vertical plane or to another wheel and these measurements are therefore made when the wheels are stationary. On the other hand, the calculation of Caster and SAI is a dynamic procedure and entails determining how the Camber of the front wheels changes with respect to a change in steering angle. This is usually done by swinging the front wheels from left to right through an angle of between 10° and 30°, or vice versa, while determining the resultant changes in Camber of the wheel with steering angle changes. From these determinations the Caster and SAI are determined by methods well known in the wheel alignment industry.

Similarly, once Camber, Toe, Caster and SAI have been measured, all other relevant wheel alignment parameters can be calculated by methods and formulations well known in the industry.

BRIEF DESCRIPTION OF THE PRIOR ART

The wheels of a motor vehicle need to be periodically checked to determine whether or not they are in alignment with each other because, if any of the wheels are out of alignment, this can result in excessive or uneven wear of the tires of the vehicle and/or adversely affect the handling and stability of the vehicle.

The typical steps of determining and correcting the alignment of a vehicle's wheels are as follows:

1. The vehicle is driven onto a test bed or rack which has previously been levelled to ensure a level base for the vehicle.

2. Some components of the alignment determination apparatus are mounted onto the wheels of the vehicle. These components are not necessarily accurately placed with respect to the wheel axis. The extent of the inaccuracy by which these components are mounted is called the "mounting error".

3. A "runout" calculation is done by jacking the vehicle up and rotating each wheel and taking measurements of the orientation of that wheel at different positions. These measurements are then used to calculate a correction factor to compensate for the "mounting error" and actual rim run-out.

4. A determination of the alignment of each of the wheels is done. The results of these determinations are compared to the specifications of alignment parameters for the vehicle being tested.

5. The operator then adjusts the various linkages of each wheel to correct for the misalignment, if any, of the wheels.

6. Steps 4 and 5 are repeated until the alignment is up to standard and/or is within manufacturer's specifications.

A large variety of devices for measuring the alignment of a motor vehicle's wheels exist. Many of these use optical instrumentation and/or light beams to determine the alignment of the wheels. Examples can be found in U.S. Pat. Nos. 3,951,551 (Macpherson); 4,150,897 (Roberts); 4,154,531 (Roberts); 4,249,824 (Weiderrich); 4,302,104 (Hunter); 4,311,386 (Coetsier); 4,338,027 (Eck); 4,349,965 (Alsina); 4,803,785 (Reilly) and 5,048,954 (Madey).

All these devices operate with an apparatus which is mounted onto the wheel of a vehicle and which emits or reflects a light beam to illuminate an area on some form of reference such as a reference grid. As the position of the area illuminated by the beam on the reference is a function of the deflection of the beam, which in turn is a function of the orientation of the wheel, the alignment of the wheel can be calculated from the positioning of the illuminated area on the reference.

Other devices utilize a measuring head mounted onto each wheel of the vehicle. These heads typically include gravity gauges that are either connected to adjacent heads by means of cords or wires under tension or, alternatively, configured with beams of light shining between adjacent heads. The measuring heads, which must be maintained level, are then able to measure the relative angles between adjacent cords/beams of light as well as the angles between each wheel and its adjacent cord/beam of light and, from these measurements, calculate the alignment of the wheels.

Another type of alignment device is illustrated in U.S. Pat. Nos. 4,899,218 (Waldecker) and 4,745,469 (Waldecker et al). This device operates by projecting structured light onto a wheel of the motor vehicle so that at least two contour lines on the surface of the wheel are illuminated. These contour lines are then read by video cameras which are positioned offset from the optical plane of the structured light and which are connected to a processor which calculates the spatial position of the contour lines (and therefore that of the wheel) by means of triangulation.

Generally, the heads used in the above described wheel alignment devices are delicate and expensive, complicated to use and must be carefully set up. Furthermore, certain of these devices rely on the accurate placing of optical or other measuring devices either on or in a set position relative to the wheels of the vehicle. This can be time consuming and complicated for the technicians operating the alignment determination apparatus. Such equipment also has the disadvantage that components which are carelessly left secured to the wheels when the vehicle is moved from the test area can very easily be damaged. Such damage, particularly in the case of sophisticated equipment, can be costly.

German patent application DE 29 48 573 in the name of Siemens Aktiengesellschaft discloses an apparatus which can be used to determine both the orientation and the spatial position of the plane of the wheel of a motor vehicle as well as the three-dimensional position of the steering axis of this wheel. The application discloses a method whereby a television camera takes an image of the rim on the wheel from two different known height positions. These images are fed into a processor which relates them to the known coordinates and viewing angles of the camera at its two height positions and determines the three-dimensional position of the rim.

In a similar way, a number of images of each wheel, in different steering positions, are taken to determine a three-dimensional solid of revolution for the wheel. From the axis of this solid of revolution the steering axis of the wheel under investigation can be determined. As a result, the three-dimensional position of both the steering axis and the center point of the plane defined by the rim of the wheel is determined.

In addition to the fact that little indication is given as to how the above values are determined, the method and apparatus of the described application has the disadvantage that, because a triangulation technique is used, at least two images (from different cameras or from a single camera viewing along different axes) of the wheel must be taken. Furthermore, both the coordinated three-dimensional position for each point from where an image of the wheel is taken as well as the orientation of each of the view paths must be accurately known.

This is a major disadvantage of this invention because the accurate determination of the three dimensional positions and the orientation of the view paths, requires sophisticated equipment which can easily go out of calibration due to temperature changes, vibration, ground movement, etc.

A further disadvantage is that the method in this application does not indicate how it makes allowances for the perspective distortion of the image of the rim of the wheel. This perspective distortion causes the image of the rim to be in the form of a distorted ellipse with the edge of the ellipse closest to the television camera appearing larger and the image of the edge farthest from the camera appearing smaller. If allowance for this distortion is not made, inaccuracies can result.

The need therefore still exists for a wheel alignment apparatus which is simple and easy to use, which has its sophisticated alignment detection components remote from the wheels of the motor vehicle, and which can provide reliably accurate alignment measurements over a large range of rim diameters, track widths and wheel bases.

SUMMARY OF THE INVENTION

Objects of the Invention

It is therefore an object of this invention to provide a wheel alignment apparatus which is simple, easy and quick to use.

It is a further object of this invention to provide a wheel alignment apparatus which can operate with its precision components removed from the motor vehicle.

Yet another object of this invention is to provide a wheel alignment apparatus which uses an opto-electronic image detection device to determine the alignment of the wheel.

Still a further object of this invention is to provide a wheel alignment apparatus which uses a perspective image, of a known target attached to a wheel, to determine the orientation of the target and thereby the alignment of the wheel.

SUMMARY

Briefly a presently preferred embodiment of this invention includes an apparatus for determining the alignment of a motor vehicle's wheels and comprises an optical sensing means such as a television camera, an electronic processing means connected to the optical sensing means, at least one predetermined target which either forms part of the wheel or is attached thereto, and a display for indicating the detected alignment. The optical sensing means views a target attached to each wheel and forms a perspective image of each target. Electronic signals corresponding to each of the images are transferred to the electronic processing means which correlates the perspective image of each of the targets with the true shape of each target. In so doing, the processor relates the dimensions of certain known geometric elements of the target with the dimensions of corresponding elements in the perspective image and by performing certain trigonometric calculations (or by any other suitable mathematical or numerical methods), calculates the alignment of the wheels of the vehicle. This invention can also be used to calculate the three-dimensional position and orientation of the axis of rotation of the wheel (wheel axis). The detected alignment is then displayed for use in performing alignment adjustments to the vehicle.

Preferably, the optical sensor means forms images of a target attached to each of at least two wheels mounted on the same axle of the vehicle and the electronic processing means calculates the relative angles between the two wheels. Even more preferably, the optical sensor means forms images of all the targets on the wheels and relative alignment calculations are computed by the electronic processor means for all these images.

DESCRIPTION OF THE DRAWINGS

FIGS. 1(a)-(c) illustrate three different images of a circle resulting from various degrees of rotation about different axes;

FIG. 3 is a representation of an exemplary target that can be used with the apparatus in FIG. 2;

FIGS. 8a–8c illustrate certain aspects of the mathematics performed in the method and apparatus of this invention;

FIG. 10 illustrates details of the camera/light subsystem of FIG. 9; and

FIG. 11 illustrates an alternative embodiment of a target array.

DESCRIPTION OF PREFERRED EMBODIMENTS

Basic Theory of the Invention

Figure 2:
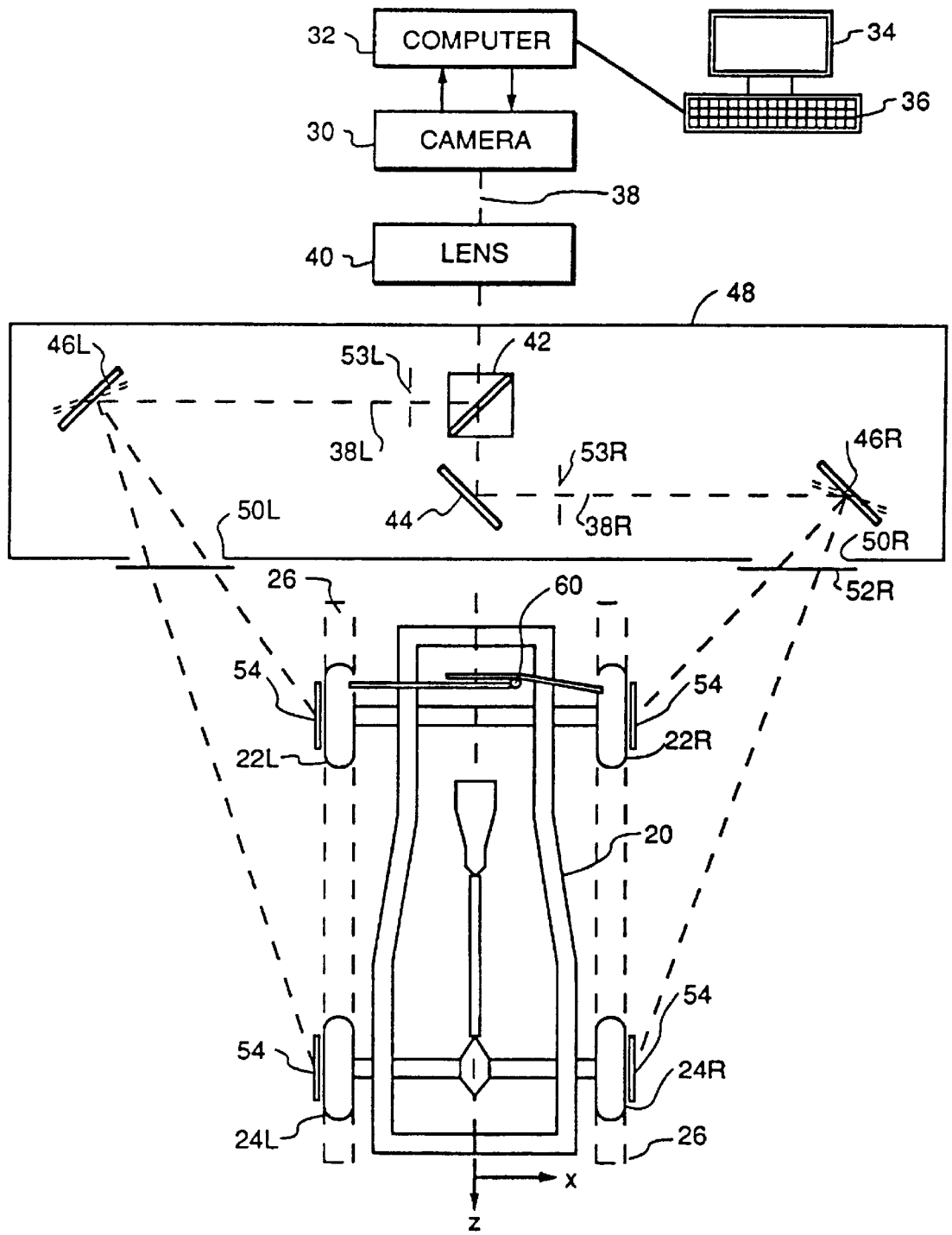
FIG. 2 is a schematic representation illustrating the apparatus and method of the invention.

This invention is based on the fact that the image of a body varies according to the perspective from which such body is viewed and that the variation in the image is directly related to and determinable from the perspective angle of the view path along which the body is viewed.

Furthermore it is known that it is possible to determine the perspective angles at which an object is viewed merely by relating the perspective image of that object with a true non-perspective image thereof. Conversely put, it is possible to determine the angles at which an object is orientated to a view path (or a plane perpendicular thereto) by comparing a perspective image of an object with a non-perspective image thereof.

This is illustrated in FIGS. 1(a)–(c) with reference to a circle 10, shown as it would appear if viewed from three different perspectives. In FIG. 1(a) the circle 10 is illustrated as it would appear if it were viewed along an axis perpendicular to its primary plane which, in this case, is in the plane of the paper. If this circle is rotated through an angle $\theta$, being less than 90°, about the y-axis 12 and viewed along the same view path, the image of the circle 10 will be that of an ellipse as shown in FIG. 1(b). Similarly, if the circle is rotated about both the x and the y-axes, 12 and 14 respectively, through angles $\theta$ and $\phi$ respectively, the image of the circle (the ellipse) will be as shown in FIG. 1(c), in which the major axis 16 of the ellipse is shown to be angled relative to both the x and y-axes.

It will, however, be realized that the ellipses here are idealized in that they make no allowance for the distortion which results in an image when it is viewed from a perspective angle. This distortion is illustrated by the broken lines 11 in FIGS. 1(b) and (c). As can be seen from these Figures, the edge of the ellipse 11, which is closer to the viewer, appears larger while the edge 11, which is farther from the viewer, appears smaller. The resulting image 11 is thus a distorted ellipse.

Returning to the idealized conditions shown in these figures, and assuming the angles $\theta$ and $\phi$ are not known, it is possible to determine the orientation of the primary plane of the ellipse illustrated in FIG. 1(c) by relating the image of the ellipse to the circle 10 in FIG. 1(a). This is usually done by relating the geometric characteristics (e.g. dimension) of at least one element of the ellipse (e.g. the major and minor axes 16, 18 thereof) to characteristics of corresponding elements (the diameters) of the circle in FIG. 1(a).

Under idealized conditions, these orientation calculations are done by applying trigonometric functions or any other mathematical/numerical methods to the ratios between the minor and/or major axis and the diameter. In addition, the angles of the minor and major axes to the horizontal (x–) axis or vertical (y–) axis can be calculated. Once all these angles have been determined, the orientation in space of the primary plane of the ellipse will be determined.

Although not illustrated, it is also possible to determine the position in space of the circle 10. This will, however, be demonstrated below with reference to FIG. 8.

The performance of the above illustrated calculations is complicated by the real-life perspective distortion of the image, as illustrated by the broken lines 11. How this foreshortening is allowed for will, once again, be discussed with reference to the mathematics illustrated in FIG. 8.

Brief Description of One Embodiment of the Alignment Apparatus of the Invention The apparatus with which this theory is applied in this invention is illustrated in the schematic representation in FIG. 2. In this figure a motor vehicle 20, on which a wheel alignment is to be performed, is represented by a schematic illustration of its chassis and is shown to include two front wheels 22L and 22R and two rear wheels 24L and 24R. The vehicle 20 is shown positioned on a conventional wheel alignment test bed 26, indicated in dotted lines, which does not form part of this invention.

The alignment apparatus of this invention is shown to be constituted by a video camera 30 which is in electrical communication with an electronic processing means such as a computer 32 which, in operation, displays results and calculations on a visual display unit 34. In addition, the apparatus includes a keyboard 36 (or some other suitable means) for inputting data and relevant information into the computer 32. It will, of course, be appreciated that display and keyboard entry could be provided by a remote unit which communicates with the computer through a cable, lightwave or radio link.

Figure 2A:
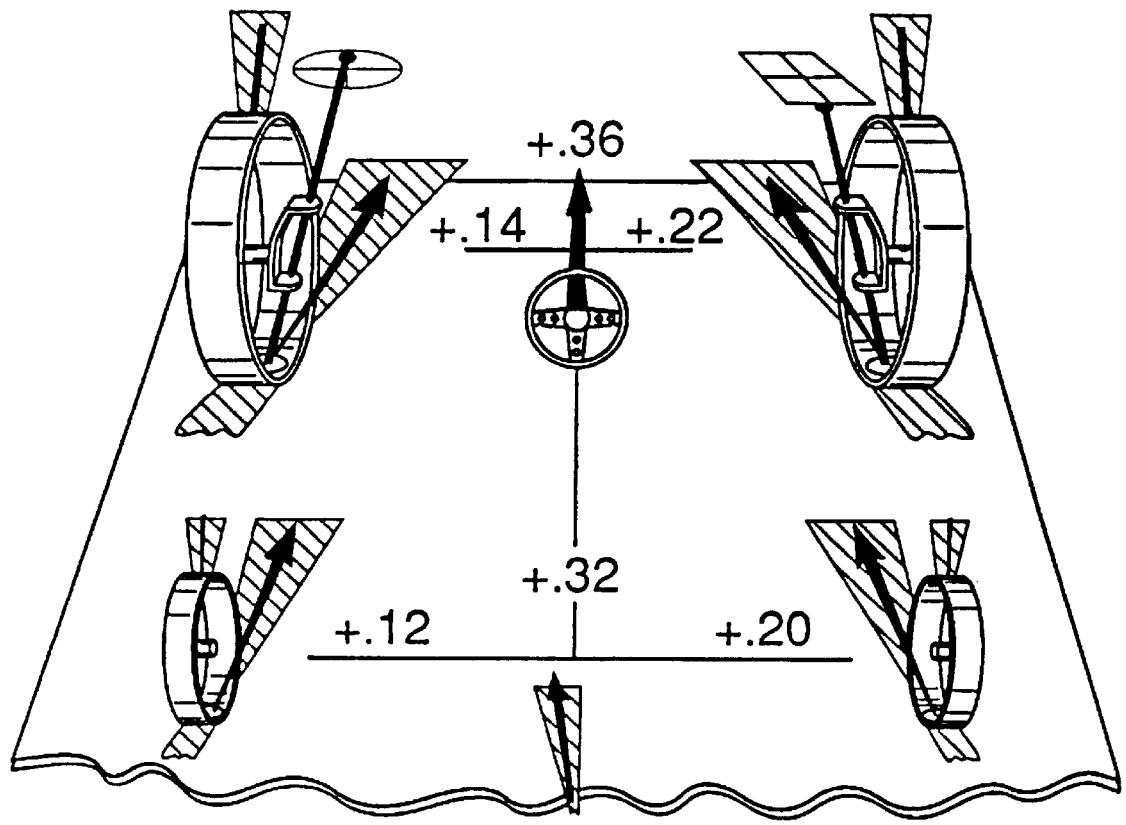
FIG. 2a is an illustration of a quasi three-dimensional representation of a type that may be generated on a system display screen to report detected alignment and to guide the technician in making appropriate vehicle adjustments.

In accordance with a preferred embodiment and as illustrated in FIG. 2a, a computer-generated quasi three-dimensional representation of the wheels being aligned may be depicted on the display unit 34 along with suitable indicia evidencing the detected alignment. In addition, alphanumeric and/or pictorial hints or suggestions may be depicted to guide the technician in adjusting the various vehicle parameters as required to bring the alignment into conformance with predetermined specifications.

The video camera 30 sights onto the wheels 22L, 22R, 24L and 24R along a view path 38 which passes through a lens 40 and onto a beam splitter 42. The beam splitter 42 splits the view path 38 into two components 38L and 38R, respectively. As is apparent from this figure, the left hand component 38L of the view path 38 is reflected perpendicularly to the initial view path by the beam splitter 42 while the right hand component 38R is reflected perpendicularly to the initial view path by a mirror or prism 44 mounted adjacent to the beam splitter. The apparatus also includes a housing 48 into which the beam splitter 42, mirror 44 and at least two pan-and-tilt mirrors, 46L and 46R, are mounted. From this point onwards the respective components of the apparatus and the view path are identical for both the left and right side of the motor vehicle and therefore a description of only one side will suffice.

The left hand component of the view path 38L is reflected onto the wheels 22L and 24L by the left side pan-and-tilt mirror 46L which is movable to allow the video camera 30 to consecutively view the front wheel 22L and the rear wheel 24L of the vehicle 20. In some embodiments of this invention the pan-and-tilt mirror 46L can be configured so that both the front and rear wheels of the motor vehicle can be viewed simultaneously.

In this embodiment, the view path 38L passes from the pan-and-tilt mirror 46L through an aperture 50L in the wall of the housing 48 and onto the respective wheels 22L and 24L. A shutter 52L is positioned so that it can be operated to close the aperture 50L thereby effectively blocking the view path 38L and allowing the video camera 30 to sight onto the right hand side of the vehicle 20 only. Alternatively, shutters could be placed at the locations 53L and 53R and/or an electronic shutter within the camera 30 could be synchronized with one or more strobed light sources to permit capture of an image only when a particular target or targets are illuminated.

Operation of the Alignment Apparatus

In a typical operation, the apparatus of this embodiment of the invention works as follows: The vehicle 20 is driven onto the test bed 26 which basically consists of two parallel metal strips on which the wheels of the vehicle rest. Under the test bed, a lift mechanism is located (but not shown) which acts to lift the metal strips and the vehicle to allow the wheel alignment technician to access the wheel mountings to correct misalignment of the wheels. In addition, a rotationally mounted circular plate commonly called a turnplate (not shown), is located under each front wheel of the vehicle. The turnplates allow the front wheels to be pivoted about their steering axes relatively easily. This facilitates the procedure involved during the calculation of caster and other angles determined dynamically. The rear wheels are positioned on elongate, rectangular, smooth metal plates mounted on the metal strips. These plates are usually termed skid plates and allow the rear wheels to be adjusted by a technician once the rear wheel mountings have been loosened. Such plates also prevent preload to wheels tending to affect their angular position.

In addition, as in some sophisticated alignment machines, the vehicle make and model year can be entered into the apparatus at some time early on in the procedure, and this information is used by the apparatus to determine the alignment parameters, for the vehicle concerned, from previously programmed lookup tables within the computer 32. Furthermore, from the vehicle's make and model year, the track width and wheelbase dimensions can be determined by retrieving the data from memory. These can be used to drive the mirrors of the alignment apparatus to "home" in on the wheels of the vehicle more accurately. Alternatively, previous operational history information can be used to select likely wheel location. Still another possibility is to cause the mirrors to sweep a particular pattern.

Once the vehicle 20 has been driven onto the test bed 26, a target 54 is mounted onto each wheel. The shape and configuration of the target will be described later with reference to FIG. 3. The apparatus first makes a "run-out" factor calculation according to the method that will more fully be described with reference to FIG. 7.

Once the "run-out" factor has been calculated, the alignment apparatus forms an image (a detected image) of each of the targets 54 on the wheels of the motor vehicle 20. These detected images are processed in the electronic processing means/computer 32 which calculates, using the method of the invention as will be more fully described, the orientation of each of the targets to the respective view paths 38L, 38R. The computer 32 then takes into account the "run-out" factors mentioned above to calculate the true orientation of the wheels relative to the respective view paths. Thereafter the apparatus makes allowance for the orientation of the pan-and-tilt mirrors 46L, 46R to calculate the actual orientation of the primary planes of each of the wheels. Upon this being done, the results of the computation are displayed on the display 34 which gives the operator the required instructions as to which corrections need to be made to, for example, adjustments to the steerage linkages 60 of the front wheels 22L and 22R to correct the detected misalignment of the wheels of the vehicle.

Orientation Calculations

The computer 32 does all the required calculations using a computer program such as IMAGE ANALYST, which is capable of analyzing images and values associated therewith. Typically, IMAGE ANALYST produces values for the center points of these images in coordinates relating to the pixels on the screen of the video camera. These values are then processed by software which incorporates the later-to-be-described mathematics illustrated with respect to FIG. 8. Although software such as IMAGE ANALYST may have many features, in this application it is apparent that the main features utilized in this application is that of being able to provide screen coordinates for the images detected by the video camera. It is, therefore, possible for software other than IMAGE ANALYST to be used with this method and apparatus. IMAGE ANALYST is supplied by AUTOMATIX, INC. of 755 Middlesex Turnpike, Billerca, Mass. 01821.

Orientation of the Pan-and-Tilt Mirrors

In the above-described method it is evident that knowledge of the orientation of the pan-and-tilt mirrors 46L, 46R is required for the effective calculation of the relative alignment of the wheels of the vehicle 20 to each other. The orientation of these mirrors 46L, 46R can be determined in one of two ways. One way of determining the orientation is by linking the mirrors 46L, 46R to a sensitive tracking and orientation determination device which outputs data to the computer 32 which, in turn, calculates the orientation of the mirrors in three-dimensional space. Alternatively, and preferably, the face of each mirror includes a clearly defined pattern, usually in the form of a number of small, spaced-apart dots, which define an identifiable pattern that can be detected by the video camera 30 as it sights onto the wheels of the motor vehicle 20. Once the video camera 30 has detected the pattern on the mirrors 46L, 46R it can form an image thereof; an image which, because of the orientation of the mirrors, will be a perspective image, and which can then be electronically fed into the computer which, in turn, can calculate the minor orientation in three-dimensional space along the same lines as the orientation of the wheels of the vehicle 20 are calculated. This second alternative is preferable because it does not require sophisticated and expensive electronic tracking and orientation determination equipment.

One way of implementing this second, preferable alternative, is to incorporate a lens 40 into the apparatus. The lens has a focal length such that it projects an adequately clear image of both the targets and the mirrors onto the camera 30.

Figure 2B:
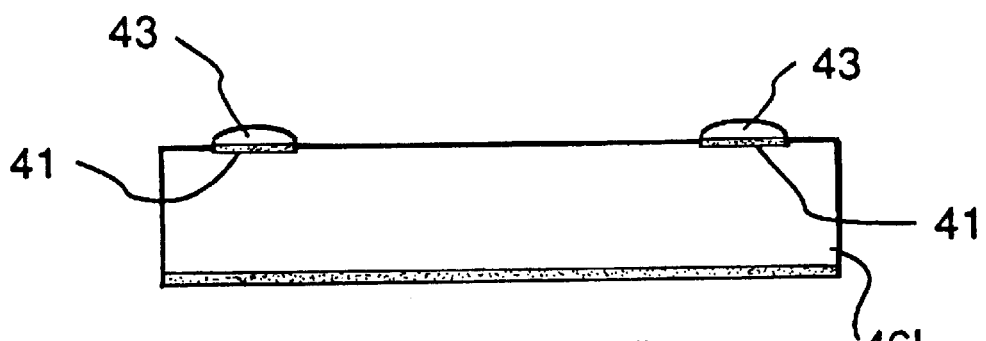
FIG. 2b is a cross-section through a pan-and-tilt mirror used in one embodiment of this invention.

In FIG. 2b, one way of enhancing the images of the dots on the pan-and-tilt mirrors is illustrated. This figure illustrates a cross-section through a pan-and-tilt mirror 46L with two dots 41 shown formed on its upper surface. A plano-convex lens 43 is located on top of each dot. The focal length of each of these lenses is such that, together with the lens 40, they form a clear image of the dots in the video camera 30. Although this figure illustrates two individual plano-convex lenses 43, it will be evident that a single lens spanning two or more dots could be used. Similarly, other optical methods can be used to accomplish this.

Orientation of the Targets

An example of a typical target 54 that can be used on the wheels of the vehicle 20 is illustrated in FIG. 3. As can be seen from this figure, the target consists of a flat plate with a pattern of two differently sized circles 62, 63 marked in a pre-determined format thereon. Although a specific pattern is shown in this figure, it will be evident that a large number of different patterns can be used on the target 54. For example, the target need not be circular, a larger or smaller number of dots may be included. Moreover, other sizes and shapes can be used for the dots. In addition, multifaceted plates or objects can also be used for the targets.

In practice, a mathematical representation, or data corresponding to a true image (i.e. an image taken by viewing the target perpendicularly to its primary plane) and the dimensions of the target are preprogrammed into the memory of the computer 32 so that, during the alignment process, the computer has a reference image to which the viewed perspective images of the targets can be compared.

The way that the computer calculates the orientation of the target 54 is to identify certain geometric characteristics on the target 54, take perspective measurements of these and compare these measurements with the true image previously preprogrammed into the memory of the computer.

The apparatus could, for example, calculate the center of each of the circles 62a, 62b by means of, say, a method called centroiding. This is a method commonly used by image analysis computers to determine the positioning of the center point or center line of an object. Once the center points of the two circles 62a, 62b have been determined, the distance between the two can be measured. This process is then repeated for other circles in the pattern on the target 54. These distances can then be compared to the true distances (i.e. non-perspective distances) between the respective centers. Similarly, the angle to the horizontal (or vertical) of the line joining the two centers can be determined. Once allowance has been made for the effect of the focal length of the lens 40 and other optical characteristics of the components, such as beam splitter 42, mirror 44 and mirrors 46L, 46R, are considered, a calculation can be made as to what the orientation of the target 54 is. This calculation can be done by using trigonometric functions or other suitable mathematical or numerical methods. As explained above, this will also yield the orientation of the primary plane of the wheel of the vehicle.

Although the above describes one method of calculating the orientation of the target 54, it will be evident that other methods are also available. For example, the apparatus could sight onto only one of the circles, say the circle 63, and by using the perspective image thereof (the distorted ellipse) calculate, in very much the same way as described with reference to FIG. 1, the orientation of that circle and, therefore, the orientation of the target 54. Another example is to take two images rotated about 600 relative to each other and use such information to calculate the orientation of the target with respect to its axis of rotation. Note that only two images are required so long as the wheel, axle does not change its axial orientation. In addition, it is envisaged that in sophisticated alignment systems more than one calculation will be completed for each target and that the different results of these calculations will be compared to each other to ensure the required accuracy.

Furthermore, as the true dimensions of the target are preprogrammed into the memory of the computer 32, the method and apparatus of this invention can be used to determine the exact position of the wheels in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target 54 is from the video camera.

As the processes described above have already yielded the orientation of target 54 with respect to the view path and/or some other reference plane, this result can be combined with the calculated distance and the geometric coordinates of the alignment apparatus to yield a position of the target 54 relative to the alignment apparatus. During this comparison process, the effect of the focal length of the lens 40, as well as the optical characteristics of the beam splitter 42, mirror 44 and the pan-and-tilt mirrors 46L and 46R must also be taken into consideration. Typically, these characteristics would be input into the computer by direct entry or, preferably, by calibration techniques. In this way the exact positioning of each of the wheels of the vehicle 20 can be calculated.

Figure 4:
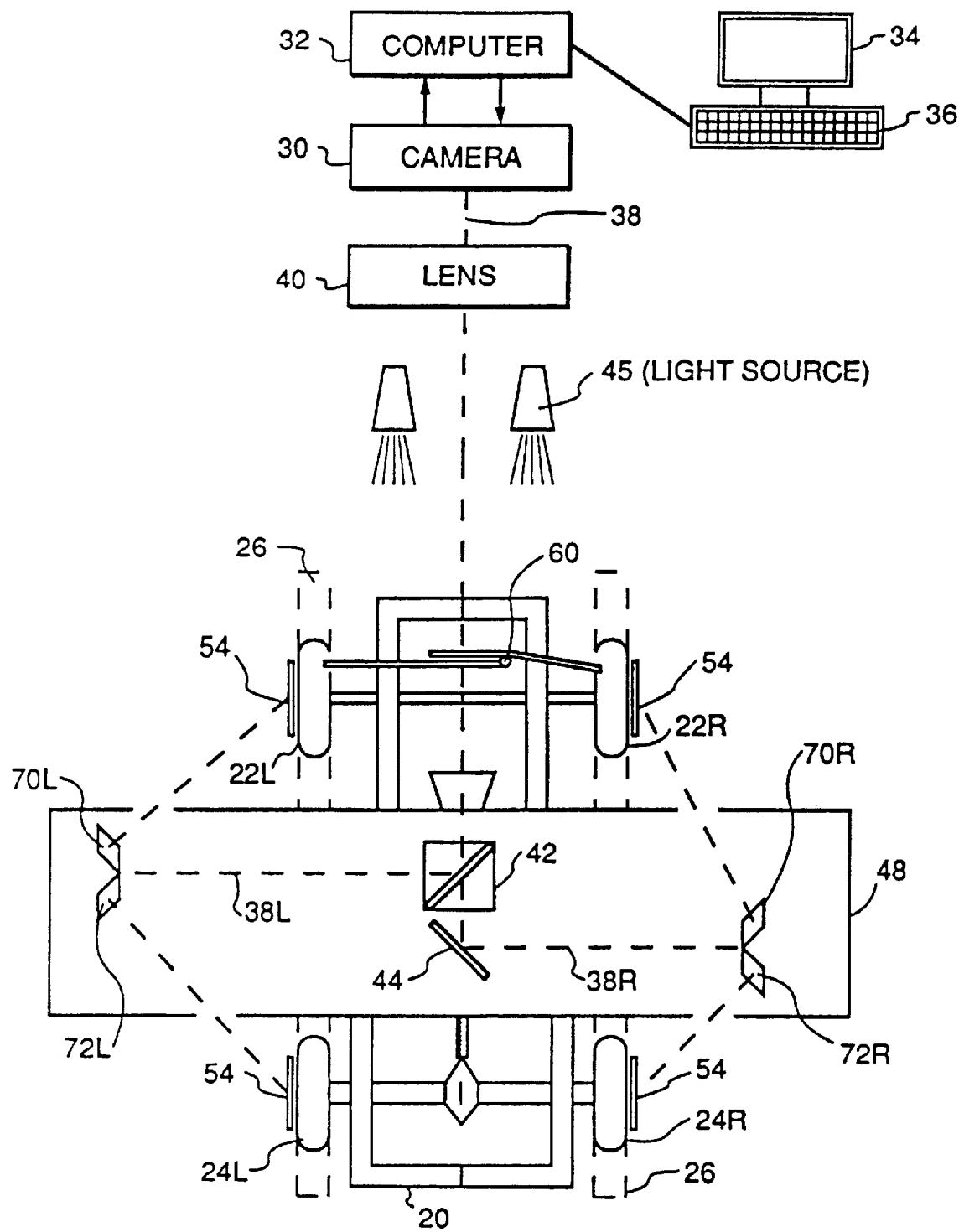
FIG. 4 is a schematic representation of an alternative embodiment of the apparatus of this invention.

A Brief Description of an Alternative Embodiment of the Apparatus of the Invention It will be evident to one skilled in the art that a number of different configurations of lens, beam splitter and mirrors (i.e. the optical system) are possible to achieve the required result with the method and apparatus of this invention. One such configuration is illustrated in FIG. 4 of the accompanying drawings.

In this figure the equipment is shown to be suspended over the motor vehicle 20 and includes a video camera 30, computer 32 with associated display 34 and data entry keyboard 36 as well as lens 40 similar to those illustrated in FIG. 2. As with the configuration in FIG. 2, the view path or optical center line of the video camera 30 is deflected into two directions 38L and 38R by a combination of beam splitter 42 and plane mirror 44.

This configuration also includes two pan-and-tilt mirrors 70L, 72L, located on the left side of the apparatus and two pan-and-tilt mirrors 70R and 72R located on the right side of the apparatus. The mirrors 70L, 72L are arranged to view the left front and left rear wheels 22L, 24L, respectively and the mirrors 70R, 72R are arranged to view the right wheels 22R, 24R respectively. As the mirrors 70L, 72L, 70R, 72R are pan-and-tilt mirrors, they can be moved to view the wheels on the vehicle 20 even though the vehicle is not accurately centered below the apparatus. These mirrors are also useful in making allowance for vehicles of different lengths of wheelbase and track width.

A further modification of this apparatus would include the replacement of the beam splitter 42 and the plane mirror 44 with a single reflecting prism. The prism has the advantage over the beam splitter combination in that more light is reflected from the prism into the camera 30. This results in a brighter image of the target 54 being formed by the camera 30.

Target and Target Image Details

Figure 5:
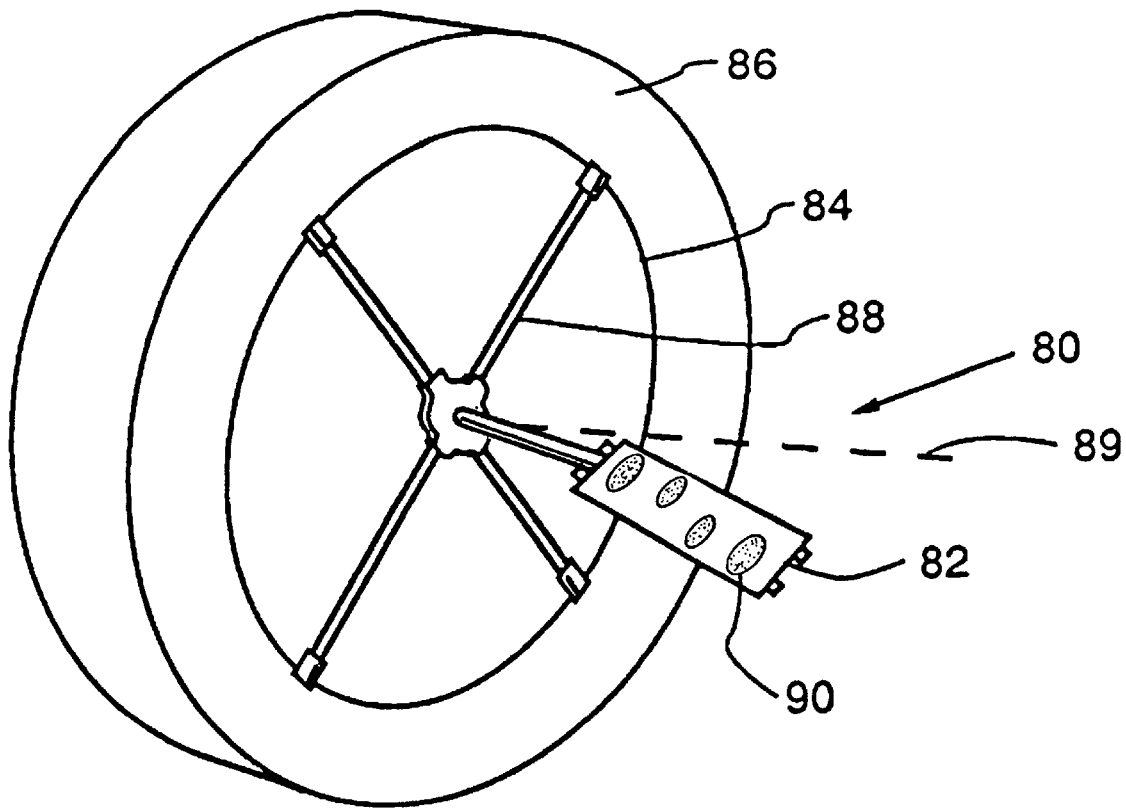
FIG. 5 is a perspective view of an alternative target mounted on a vehicle's wheel.

With the apparatus as illustrated in this figure, as with the other illustrated apparatus, a modification of the target, as indicated in FIG. 5, can be used. In this figure the target, generally indicated as 80, is shown to include a flat, rectangular plate 82 which is clamped to the rim 84 of a wheel 86 by means of a clamping mechanism 88. It will be evident from FIG. 5 that the plate 82 is angled relative to the primary plane of the wheel 86 as well as to its axis of rotation 89.

The precise orientation of this plate 82 relative to the wheel axis is, however, not known and will, as is described later, be computed with respect to the wheel axis by the determination of a run-out factor for this wheel. The general orientation of the plate 82 is, however, chosen so that it can be adequately viewed by the video camera 30 as it sights onto it.

Finally, plate 82 includes a plurality of dots 90 which, as shown, constitute a pattern not unlike that on the target illustrated in FIG. 3.

Figure 6:
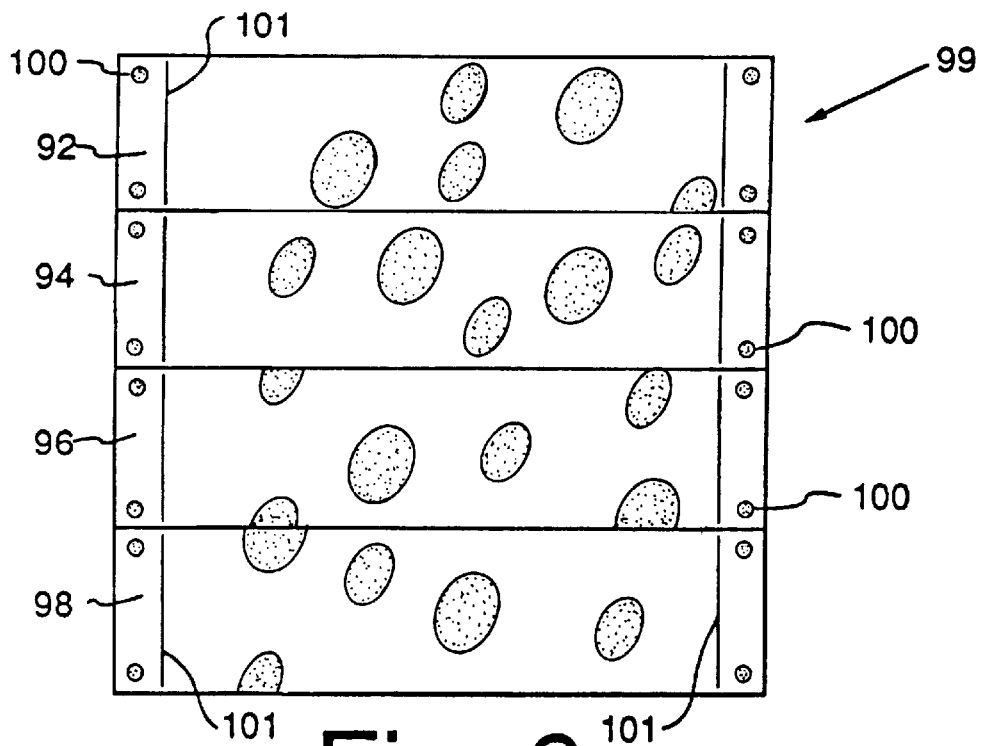
FIG. 6 is a schematic representation of an image of the target illustrated in FIG. 5 formed by using the optical system in FIG. 4.

With targets of this nature, the images formed by the video cameras 30, when used together with the apparatus illustrated in FIG. 4, will be something like that illustrated in FIG. 6. In this figure, it is apparent that four discrete images 92, 94, 96, 98 are formed to make up the complete image, generally indicated as 99, formed by the video camera 30. Each of the four images that make up the complete image 99 is an image of one of the rectangular plates 82, respectively disposed on the four wheels of the motor vehicle. For example, the image 92 at the top of the picture 100 could correspond to the plate 82 on the right rear wheel 24R of the vehicle 20. Similarly, image 94 could correspond to the right front wheel 22R, image 96 to the left front wheel 22L and image 98 to the left rear wheel 24L.

The advantage of the target 80 when used with the apparatus illustrated in FIG. 4 is that a single image can be taken simultaneously of all four wheels. This single image can then be processed, in very much the same way as described above, to yield the orientation and location of all the wheels to each other. More particularly, the relative orientation of the right front wheel to the left front wheel and the right rear wheel to the left rear wheel can be calculated.

On either end of the images 92, 94, 96, 98 a pair of dots 100 can be seen. These dots 100 are in fact images of the dots on the respective pan-and-tilt mirrors referred to in the discussion of FIG. 2. As was pointed out in that discussion, these dots are used to calculate the orientation of the pan-and-tilt mirrors to the view path of the camera; a calculation which is essential to determine both the orientation and the location of the primary plane of each of the wheels of the vehicle.

In addition, this figure illustrates that the images of the marks 100 can be separated from the images of the patterns on the plate by means of a vertical line 101. This line 101 serves as a demarkation line between the pattern (from which the orientation of the target is calculated) and the image of the dots 100 (from which the orientation of the pan-and-tilt mirrors is calculated).

Runout Factor Calculations

Figure 7:
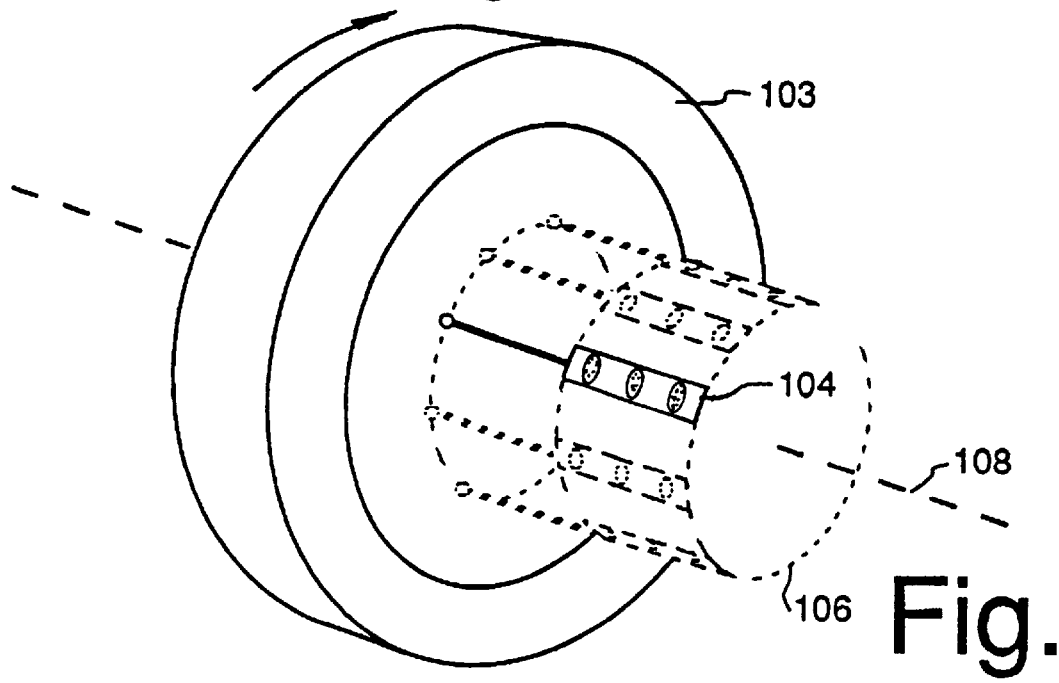
FIG. 7 illustrates one method of how the apparatus calculates the run-out factor of the wheel.

In FIG. 7 of the drawings, a method of calculating the run-out factor for a target 104 mounted in a slightly different way on a wheel 103 is illustrated. In this method, the wheel 103 is slowly rotated while a number of different images of the target 104 are taken. This target is, for the sake of clarity, off-set fairly substantially from the center of the wheel. In practice, however, the target may be mounted closer to the center, much like the target illustrated in FIG. 5. For each image, the inclination of the plane of the target, as well as its location in space is calculated. Once these have been determined for each image, they are integrated to define a surface of revolution 106. This surface of revolution 106 will represent the path which the target 104 tracks as the wheel is rotated about its axis, and the axis of rotation 108 thereof is the same as the axis of rotation of the wheel. This means that a plane perpendicular to the axis of rotation 108 of the surface of revolution 106 will be parallel to the primary plane of the wheel 106. As the surface of revolution 106 is determined, its axis of rotation 108 is determined and, therefore, the orientation and position in space of the primary plane of the wheel of the vehicle can be determined.

From these results, the run-out factor can be determined by calculating the angle between the plane of the target and the primary plane of the wheel. This run-out factor is then stored in the computer 32 and used when the alignment of the wheel is calculated from a single image of the target.

The calculation of the run-out factor can also be used to determine whether or not the suspension of the vehicle is badly worn. Using the method of the invention an apparent run-out factor (i.e., the orientation of the target with respect to the wheel) can be determined for each image which is taken of the target. From this group of individual run-out factors a mean value can be calculated (which will represent the true "run-out" factor) as well as the extent of the deviation from the mean of the individual factors. If this deviation is above a certain tolerance, this indicates that the suspension of the motor vehicle is worn so badly that it needs to be attended to.

Accuracy Determination

Turning once again to the targets, it should be realized that an important feature of the target illustrated either in FIG. 3 or 5 (or any other target for that matter) is that it should have sufficient data points to allow redundant calculations to be made using different sets of data points. This will yield multiple wheel alignment angles which can be averaged out to improve the accuracy of the final measurement. In addition, a statistical distribution of the different alignment angles calculated for each wheel can be used as a measurement of accuracy of the operation of the apparatus. If a suitable check is built into the computer 32, a statistical distribution such as this can enable the computer 32 to determine whether or not sufficient accuracies exist and, if not, to produce a signal which can alert an operator to this fact.

Similarly, if the above checking indicates that one or more of the targets used yield(s) unacceptably poor results while the remaining target(s) yield acceptable results, it can be assumed that some of the targets being used are unacceptable. The computer can give an indication to this effect and the operator can, for example, be instructed to remove, clean or repair the offending target(s).

A further benefit derived from forming suitable multiple images and computing a statistical analysis, is that the computer 32 can determine whether or not enough images have been taken to suitably ensure the required accuracy of the alignment measuring process. If insufficient readings exist, the computer can direct the apparatus to take further readings which, although sacrificing speed, would result in improved accuracy of the measurement.

Furthermore, the target could include a machine-readable, e.g. a bar code or the like, which can be used for identification, target tracking, intensity threshold measurement, evaluation of illumination quality, and encoding of defects to allow the use of cheap targets. For example, if the target was twisted and the amount of twist was encoded in the bar code, then the computer could compensate for the twist.

Another important feature of the target is that the pattern thereon should allow very quick and accurate location of the pattern to an accuracy approaching substantially less than a camera pixel. To achieve this the pattern should exhibit a high contrast and be of a configuration which allows the specific apparatus used to achieve the required speed and accuracy. In one embodiment, retro-reflective materials are used for the dots, and a color that is absorptive of the particular light used is chosen for the background.

This apparatus also allows for calibration, which is important as all optical systems have some geometric distortion. The total image area of the apparatus could, for example, be calculated using a perfect target and the result used to determine correction values that can be stored for use when operating the system in alignment procedures.

The absolute accuracy of the apparatus can be checked or calibrated by using a simple 2-sided flat plate target which is placed so that the apparatus views both sides simultaneously. As the plate is flat, the net angle (relative alignment) between the two planes of the target should be zero. If not, a suitable correction factor can be stored in the computer. Alternatively, two views of the same side of the target taken from different angles could be used for this purpose.

Mathematical Algorithms Used

This section provides the mathematics necessary to reduce measurements made by the video camera to wheel positions in space using instantaneous measurement.

Assumptions

The camera system can be defined to include two planes positioned arbitrarily (within reasonable constraints of visibility) with respect to one another. One is the image plane, which maps what is "seen" by the camera and the other is the object plane, which contains three-dimensional, essentially point targets.

Based on this, the assumptions made are:

(i) the camera principal axis is normal to the image plane (most cameras are built this way);

(ii) there exists, at a known distance of $f$ (i.e. the imaging system's focal length when set at infinity) from the image plane, along the camera principal axis, a point called the center of perspectivity (CP) such that the behavior of the camera is that the image of a viewed point anywhere in the camera's field of view is to project it onto the image plane by moving it along a line passing both through the viewed point in space and the CP;

(iii) the origin of the coordinate system fixed in the image plane is located at the center of perspectivity, with z unit vector directed toward camera along its principal axis; and (iv) the units of the image plane measurements are the same as those of the object plane measurements.

These assumptions are commonplace in the visual sciences.

Overview

For this configuration, mathematics can be provided to determine the relative orientations and positions of the object and image planes.

This mathematics can be used in 2 ways:

(i) during calibration, to find the position of the image plane with respect to the location of an object plane of known position of a calibration target; and (ii) during the alignment process, to find the position and orientation of the primary plane of the target mounted on the wheels of the vehicle. It is essential in this step that the known coordinate system is fixed in space, and that it remains the same for all four wheels of the car.

As has been described above, once the location of the target planes on the wheels is known, by rotating the wheels, the axis of rotation of the wheels can be determined, and from there, the alignment of the wheels.

Main Algorithm

It should be noted that this main algorithm presents no treatment of the various pan-and-tilt mirrors; this is done later.

The main algorithm requires the following inputs:

(i) A list of points expressed in object plane coordinates.

$$^o q_j = (x_j, y_j), j=1, n/n \geq 4$$

These are actually three-dimensional points, but the object plane coordinate system can always be chosen so that the third coordinate $z_j = 0$.

(ii) A corresponding list of image plane point coordinates $^i q_j = (u_j, v_j), j=1, n$.

For these inputs, the algorithm produces an output which is a homogeneous coordinate transform matrix expressing the center of perspectivity and unit vectors fixed with respect to the principal axes of the image plane. This matrix will normally be inverted, and then applied to transform the viewed points into image system coordinates.

Step 1: Determine a Collineation

Convert all the two-dimensional input coordinates to affine form and find a 3×3 transformation matrix T such that:

$$\begin{bmatrix} k_i u_i \\ k_i v_i \\ k_i \end{bmatrix} = [T] \begin{bmatrix} x_i \\ y_i \\ 1 \end{bmatrix} \qquad (1)$$

for i=1, n and where the $k_i$ are arbitrary scalar constants.

One way in which the transformation matrix T can be determined is given below.

Step 2: Determine transforms of key points and invariants.

The transform matrix T will transform points in the object plane to points in the image plane under the projectivity whose center is the center of perspectivity (CP). When inverted, it will also perform the reverse transformation, viz:

$$\begin{bmatrix} m_i x_i \\ m_i y_i \\ m_i \end{bmatrix} = [T^{-1}] \begin{bmatrix} u_i \\ v_i \\ 1 \end{bmatrix} \qquad (2)$$

It will be noted that the whole equation may be multiplied by an arbitrary scalar and still remain true. The value $m_i$ is such a scalar, and is required to permit normalization of $(u_i\ v_i\ 1)^T$ so that its third coordinate is a unit. The matrix T is also useful for transforming lines, which are dual to points on the projective plane. The equation of a line in the projective plane is:

$$[c_1\ c_2\ c_3]\begin{bmatrix} x_1 \\ x_2 \\ x_3 \end{bmatrix} = 0 \quad c^T X = 0 \qquad (3)$$

Where c is the coordinate vector of the line and X is the specimen vector. Any homogeneous representation of a point which satisfies equation 3 lies on the line. Suppose that an object co-ordinate $^o c$ lies on a line, then:

$$[^o c][^o x] = 0 \qquad (4)$$

is the equation of a line in the object plane, expressed in object plane coordinates. Using equation 2 we can transform to image plane co-ordinates:

$$[^o c][T^{-1}][^i x] = 0 \qquad (5)$$

or $$[^i c][^i x] = 0 \qquad (6)$$

Therefore $$[^i c] = [T^{-1}][^o c] \qquad (6)$$

is the way to transform line coordinates from the object plane to the image plane and $$[^o c] = [T^T][^i c] \qquad (7)$$

is the way to perform the inverse transformation.

Note that the projective plane differs from the non-projective plane in that it includes points at infinity whose projective coordinate is 0. These points together constitute a line at infinity, whose coordinates are [0,0,1] viz.

$$[0\ 0\ 1]\begin{bmatrix} x \\ y \\ w \end{bmatrix} = 0 \qquad (8)$$

$$\Rightarrow W = 0$$

This is illustrated in FIG. 8a which represents a side view of an object plane OP and image plane IP positioned non-parallel to each other at some angle θ.

The object plane OP intersects a plane parallel to the image plane IP but passing through the center of perspectivity CP. This plane is called the view image plane VIP and intersects the object plane OP at the "vanishing line" mapped to the object plane, shown as point VLO. Similarly, the figure shows a plane parallel to the object plane called the viewed object plane VOP which intersects the image plane IP at a "vanishing line" mapped to the image plane, shown as point VLI.

As VIP is parallel to IP they intersect at infinity. The collineation matrix T can therefore be used to map the line at infinity of the image to its transformed position in the object plane as follows:

$$VLO \equiv \begin{bmatrix} b_1 \\ b_2 \\ b_3 \end{bmatrix} = [T^T]\begin{bmatrix} 0 \\ 0 \\ 1 \end{bmatrix} \qquad (9)$$

and likewise:

$$VLI \equiv \begin{bmatrix} a_1 \\ a_2 \\ a_3 \end{bmatrix} = [T^{-1}]\begin{bmatrix} 0 \\ 0 \\ 1 \end{bmatrix} \qquad (10)$$

By the assumptions stated above with respect to the camera system, the coordinates of the principal point of the image PPI are:

$$PPI = \begin{bmatrix} 0 \\ 0 \\ 1 \end{bmatrix} \qquad (11)$$

The coordinates of the principal point of the object PPO are:

$$PPO \equiv \begin{bmatrix} c_1 \\ c_2 \\ c_3 \end{bmatrix} = [T^{-1}]\begin{bmatrix} 0 \\ 0 \\ 1 \end{bmatrix} \qquad (12)$$

Step 3: Complete Remaining Inclination Values

The minimum distance between a line in a projective plane with line coordinates $[z_1\ z_2\ z_3]^T$ and a point with coordinates $[p_1\ p_2\ p_3]^T$ is given by $$d = \left| \frac{z_1 p_1 + z_2 p_2 + z_3 p_3}{p_3 \sqrt{z_1^2 + z_2^2}} \right| \quad (13)$$

This makes it possible to solve for DI, θ and DO:

$$DI = \left| \frac{a_3}{\sqrt{a_1^2 + a_2^2}} \right| \quad (14)$$

$$\theta = \arctan\left(\frac{f}{DI}\right) \quad (15)$$

$$DO = \left| \frac{b_1 c_1 + b_2 c_2 + b_3 c_3}{c_3 \sqrt{b_1^2 + b_2^2}} \right| \quad (16)$$

Step 4: Compute Pan Values

FIG. 8b illustrates a plan view of the object plane, looking down from the center of perspectivity.

We have $$\phi = \arctan\left(\frac{-b_2}{b_1}\right) \quad (17)$$

Let $$\begin{aligned} x_+ &= sgn(S_x - PPO) \cdot {}^o\hat{x} \\ &= -sgn\left(\frac{b_1 c_1 + b_2 c_2 + b_3 c_3}{b_1 c_3}\right) \end{aligned} \quad (18)$$

$$\begin{aligned} y_+ &= sgn(S_y - PPO) \cdot {}^o\hat{y} \\ &= -sgn\left(\frac{b_1 c_1 + b_2 c_2 + b_3 c_3}{b_2 c_3}\right) \end{aligned} \quad (19)$$

Step 5: Solve for Remaining Unknowns

Referring to FIGS. 8a and 8b together:

$$DCP = |DO \cdot \sin\theta| \quad (20)$$

$${}^o\hat{z}_i = \begin{bmatrix} x_+ \cdot \sin\theta \cos\phi \\ y_+ \cdot \sin\theta \sin\phi \\ \cos\theta \end{bmatrix} \quad (21)$$

$$\begin{aligned} {}^oO_i &= {}^oPPI = {}^oPPO + DCP \cdot {}^o\hat{z}_i \\ &= \begin{bmatrix} \frac{c_1}{c_3} \\ \frac{c_2}{c_3} \\ 0 \end{bmatrix} + DCP \cdot {}^o\hat{z}_i \end{aligned} \quad (22)$$

This is the origin of the image plane coordinate system expressed in object plane coordinates. It is located at CP. ${}^o\tilde{x}_i$ and ${}^o\tilde{y}_1$ the remaining unit vectors can be computed by transformation of the corresponding unit vectors in the image plane, and subsequent orthogonalization with respect to $z_1$.

Let $$\begin{bmatrix} x_1 \\ x_2 \\ x_3 \end{bmatrix} = [T^{-1}] \begin{bmatrix} 1 \\ 0 \\ 0 \end{bmatrix} \quad (23)$$

Then $${}^o\tilde{x}_i \equiv \begin{bmatrix} \frac{x_1}{x_3} - \frac{c_1}{c_3} \\ \frac{x_2}{x_3} - \frac{c_2}{c_3} \\ 0 \end{bmatrix} \quad (24)$$

can be orthogonalized with respect to ${}^o\hat{z}_i$ $${}^o\tilde{x}_i' = {}^o\tilde{x}_i - ({}^o\tilde{x}_i \cdot {}^o\hat{z}_1) \, {}^o\hat{z}_f \quad (25)$$

and renormalized $${}^o\hat{x}_i = \frac{{}^o\tilde{x}_i'}{{}^o\tilde{x}_4'} \quad (26)$$

Similarly, let $$\begin{bmatrix} y_1 \\ y_2 \\ y_3 \end{bmatrix} = [T^{-1}] \begin{bmatrix} 0 \\ 1 \\ 0 \end{bmatrix} \quad (27)$$

Then $${}^o\tilde{y}_1 = \begin{bmatrix} \frac{y_1}{y_3} - \frac{c_1}{c_3} \\ \frac{y_2}{y_3} - \frac{c_2}{c_3} \\ 0 \end{bmatrix} \quad (29)$$

$${}^o\tilde{y}_i' = {}^o\tilde{y}_i - ({}^o\tilde{y}_i \cdot {}^o\tilde{y}_1) \, {}^o\hat{z}_i$$

and $${}^o\hat{y}_i = \frac{{}^o\tilde{y}_i'}{{}^o\tilde{y}_i'} \quad (30)$$

Finally $${}^oF_i = \begin{bmatrix} {}^o\hat{x}_i & {}^o\hat{y}_i & {}^o\hat{z}_i & {}^oO_i \\ \hline 0 & 0 & 0 & 0 \end{bmatrix} \quad (31)$$

Frames transform from image space to object space is the frame to return, and to express points given in the object plane coordinates in terms of the coordinate system fixed with respect to the image plane, we note $${}^iF_0 = {}^oF_i^{-1} \quad (32)$$

and $${}^iq_k = {}^iF_0 \begin{pmatrix} x_k \\ y_k \\ 0 \\ 1 \end{pmatrix} \quad (33)$$

That is the general case, but there is also the special case when the object and image planes are parallel. This is detectable when VLO or VLI (equations 9 or 10) turn out to lie at infinity themselves (meaning their first two coordinates lie sufficiently close to 0).

In this case, $$^oz_1 = \begin{pmatrix} 0 \\ 0 \\ 1 \end{pmatrix} \quad (34)$$

and the distance DCP can be determined by taking any point in the object plane $(x_k, y_k)$ whose corresponding $(u_k, v_k)$ is not zero and calculating according to the diagram in FIG. 8(c):

Let $$r_o = \sqrt{x_k^2 + y_k^2} \quad (35)$$

$$r_i = \sqrt{u_k^2 + v_k^2} \quad (36)$$

$$DCP = \frac{r_o}{r_i} f \quad (37)$$

and then proceeding as from equation (22).

This concludes the description of the main algorithm to determine plane displacements.

9.4 Determination of Transform Matrix

This section illustrates how to calculate the transform matrix T used in equation (1).

The method presented here is an analytic method which maps between only 4 coplanar points and is based on the fundamental theorem of projective geometry which tells us that given four points in the projective plane:

$$p_1 = (x_1\ y_1\ w_1)$$
$$p_2 = (x_2\ y_2\ w_2)$$
$$p_3 = (x_3\ y_3\ w_3)$$
$$p_4 = (x_4\ y_4\ w_4) \quad (38)$$

constants $c_1$, $c_2$ and $c_3$ can be found such that $$p_4 = c_1 p_1 + c_2 p_2 + c_3 p_3 \quad (39)$$

When this is represented in matrix form:

$$(x_4\ y_4\ w_4) = (c_1\ c_2\ c_3) \begin{pmatrix} x_1 & y_1 & w_1 \\ x_2 & y_2 & w_2 \\ x_3 & y_3 & w_3 \end{pmatrix} \quad (40)$$

then the matrix M consisting of $$M = \begin{pmatrix} c_1 & 0 & 0 \\ 0 & c_2 & 0 \\ 0 & 0 & c_3 \end{pmatrix} \begin{pmatrix} x_1 & y_1 & w_1 \\ x_2 & y_2 & w_2 \\ x_3 & y_3 & w_3 \end{pmatrix} \quad (41)$$

will transform the ideal points origin and unit points as follows:

$$p_1 = (1\ 0\ 0)M = i_x M \text{ (unit x vector)}$$
$$p_2 = (0\ 1\ 0)M = i_y M \text{ (unit y vector)}$$
$$p_3 = (0\ 0\ 1)M = oM \text{ (origin)}$$
$$p_4 = (1\ 1\ 1)M = uM \text{ (unit point)}$$

Therefore, to construct a transform which maps four arbitrary points $p_1, p_2, p_3, p_4$ to four arbitrary other points $q_1, q_2, q_3, q_4$, two transforms must be constructed:

$$\begin{array}{cc} M_1 & M_2 \\ i_x \rightarrow p_1 & i_x \rightarrow q_1 \\ i_y \rightarrow p_2 & i_y \rightarrow q_2 \\ 0 \rightarrow p_3 & 0 \rightarrow q_3 \\ u \rightarrow p_4 & u \rightarrow q_4 \end{array} \quad (43)$$

and then M, such that $$q_i p_i\ M \quad (44)$$

is given by $$M = M_1^{-1} M_2 \quad (45)$$

Note that in this section, the p's and q's are now vectors. In the main section, column vectors are used, so $$T = M^T \quad (46)$$

Finally, another method (not illustrated here) accepts more than four points and does a least-squares approximation using pseudo-inverses. This second method can be used in the case where the number of points measured has been increased to compensate for expected errors.

Allowance for Pan-and-Tilt Mirrors

After the imaged data points have been converted back to three-dimensional points given in image plane coordinates, it remains to make allowance for reflections by the beam splitter assembly and the pan-and-tilt mirrors.

If $^ix$ is a point to be reflected, and in is a unit-length normal to the plane of reflection, $^ix_o$ is a point in the plane of reflection (all expressed in image-plane coordinates) then $^ix_r$, its reflection is given by $$\begin{bmatrix} ^ix_r \\ 1 \end{bmatrix} = \begin{bmatrix} I - 2^i n^i n^T & 2^i n^i n^T {}^ix_0 \\ 0 & 1 \end{bmatrix} \begin{bmatrix} ^ix \\ 1 \end{bmatrix} \quad (47)$$

The matrix above is a standard displacement style transform which may be inverted using standard methods though there is no need to do so in the present application. These matrices may also be cascaded as usual from right to left, to deal first with the beam-splitter and then with the pan-and-tilt mirror, but the reflection plane point $^ix_o$ and normal $^in$ for the pan-and-tilt mirror must first be transformed by the beam-splitter reflection matrix before the pan-and-tilt mirror reflection matrix is formed from them.

Finally, it should be noted that when the main algorithm is used to find the position of the pan-and-tilt mirror, once these have been reflected through the beam splitter. $^o\tilde{z}_o$ and $^iO_o$ are directly usable as normal and point in the reflection plane directly.

A subsequent use of an iterative fitting procedure may result in improved accuracies.

Other mathematical processes can also be used to process the images detected using the apparatus of the present invention.

Alternative Two-Camera Embodiment

Figure 9:
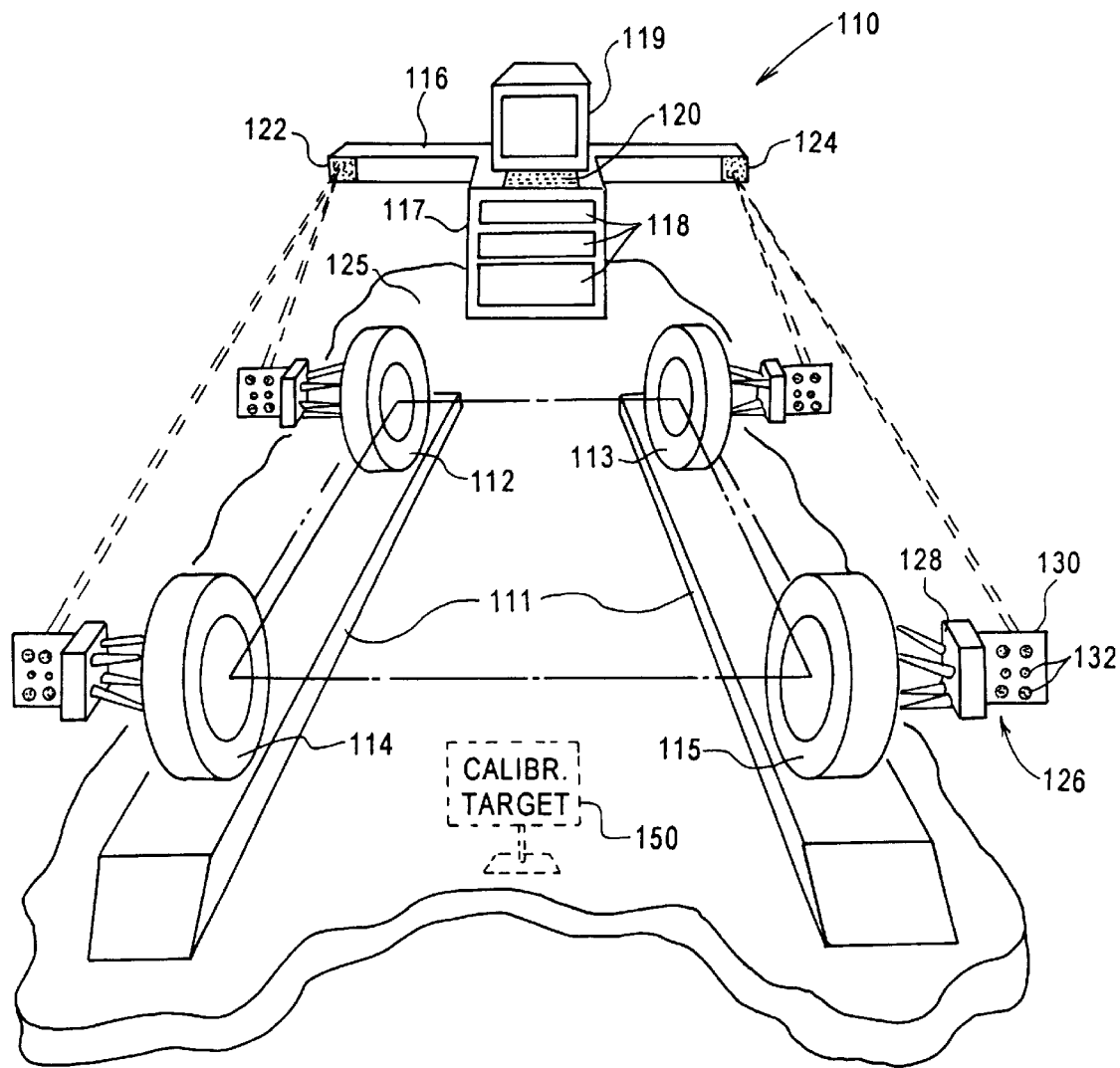
FIG. 9 is a diagram schematically illustrating another alternative embodiment of the present invention.

In FIG. 9 of the drawing, an alternative embodiment of the present invention utilizing a pair of fixed, spaced-apart cameras is depicted at 110. A four-wheeled vehicle positioned on a lift ramp 111 for wheel alignment is suggested by the four wheels 112, 113, 114, and 115. In the usual case, the rack 111 will include pivot plates (not shown) to facilitate direction change of at least the front wheels. In this embodiment a camera supporting suprastructure includes a horizontally extending beam 116 affixed to a cabinet 117. The cabinet 117 may include a plurality of drawers 118 for containing tools, manuals, parts, etc., and may also form a support for a video monitor 119 and input keyboard 120.

Mounted at each end of the beam 116 is a camera and light source subsystem respectively designated 122 and 124. The length of beam 116 is chosen so as to be long enough to position the camera/light subsystems outboard of the sides of any vehicle to be aligned by the system. The beam and camera/light subsystems 122, 124 are positioned high enough above the shop floor 125 to ensure that the two targets on the left side of the vehicle are both within the field of view of camera assembly 122, and the two targets on the right side of the vehicle are both within the field of view of camera assembly 124. In other words, the cameras are positioned high enough that their line of view of a rear target is over the top of a front target. This can, of course, also be accomplished by choosing the length of beam 116 such that the cameras are outside of the front targets and have a clear view of the rear targets. Details of the camera/light subsystems 122, 124 are discussed below with respect to FIG. 10.

In accordance with this embodiment, a target device 126, including a rim-clamp apparatus 128 and a target object 130, is attached to each wheel. A suitable rim-clamp mechanism is discussed in U.S. Pat. No. 5,024,001 entitled "Wheel Alignment Rim Clamp Claw". As will be described in more detail below, the preferred target object has at least one planar, light-reflective surface with a plurality of visually perceptible, geometrically configured, retro-reflective target elements 132 formed thereon. Such target surfaces may be formed on one or more sides of the target object. In use, each target must be positioned on a vehicle wheel with an orientation such that the target elements are within the field of view of at least one of the camera/light subsystems.

In FIG. 10 of the drawing, further detail of the camera and lighting components is illustrated. Mounted within the partially broken-away end of beam 120, the subsystem 122 is shown to include a lighting unit 140, comprised of a plurality of light emitting diode (LED) light sources 142 arrayed about an aperture 144 through which the input optics 146 of a suitable video camera 148 is projected. The light array in the preferred embodiment includes 64 LEDs (a lesser number being shown for simplicity of illustration) which provide a high-intensity source of on-axis illumination surrounding the camera lens, to ensure that maximum light is retro-reflected from the targets. In order to discriminate against other possible sources of light input to the camera 148, a narrow band filter matched to the light spectrum of the LEDs may be positioned in front of the lens 146.

Although any suitable type of video camera can be utilized, in accordance with the preferred embodiment a CCD device is utilized. This camera has a resolving power suitable for the present application.

In FIG. 11, an example of a target in accordance with a preferred embodiment is depicted and includes a plurality of light-reflective, circular target elements or dots of light-colored or white retro-reflective material disposed in an array over a less reflective or dark-colored surface of a rigid substrate. Suitable retro-reflective materials include Nikkalite™ 1053 sold by Nippon Carbide Industries USA, Scotchlite™ 7610 sold by 3M Company, and D66-15xx™ sold by Reflexite, Inc.

The target includes multiple circular dots so as to ensure that sufficient data input may be grabbed by the camera even in the case that several of the target elements have been smudged by handling or are otherwise not fully detectable. In accordance with the preferred embodiment a well defined target includes approximately 30 circular dots very accurately positioned (within 0.0002") with respect to each other. By way of specific example, the target illustrated in FIG. 11 might include 28 circular dots of 1" diameter very accurately positioned on a 2"×2" grid, with four 1¼" dots and a single 1½" diameter dot strategically positioned within the array. By mathematically moving the mathematical image of a target until the mathematical position and orientation of the dots line up with the dots of the real target in the real image, position and orientation information can be obtained. This mathematical manipulation of a well defined target until it is oriented the same way as the image is called "fitting the target." Once the fitting is accomplished, the position and orientation of the target is very accurately known (to within 0.05" and 0.005°). Such accuracy is obtainable because the target is made to very strict tolerances and because the design enables measurement of many points (1,500 measured points, i.e. 30 or so fiducials (dots) each with detected 50 edge points). Furthermore, the use of subpixel interpolation enhances the accuracy of measurement to beyond the pixel resolution of the CCD cameras.

The target is typically manufactured using a photolithographic process to define the dot boundaries and ensure sharp-edge transition between light and dark areas, as well as accurate and repeatable positioning of the several target elements on the target face. The target face may also be covered with a glass or other protective layer. Note that since all information obtained from a particular target is unique to that target, the several targets used to align a vehicle need not be identical and can in fact be of different makeup and size. For example, it is convenient to use larger rear targets to compensate for the difference in distance to the camera.

In order to accurately determine the position between the wheels on one side of the vehicle and the wheels on the other side of the vehicle, the system must know where one camera is positioned with respect to the other camera. This is accomplished during a calibration and set up operation wherein, as depicted in FIG. 9, a larger target 150 (presently 3'×3') is positioned in the field of view of both cameras, typically along the centerline of the rack 111, and the approximately 30 feet away from the cameras. Information obtained from each camera is then used to determine the relative positions and orientations of the cameras. More specifically, since each camera will indicate where the target is with respect to itself, and since each is viewing the same target, the system can calculate where each camera is located and oriented with respect to the other. This is called a relative camera position (RCP) calibration. Such calibration allows the results obtained from one side of the vehicle to be compared to the other. Thus, by mounting the two cameras rigidly with respect to each other and them performing an RCP calibration, the system can be used to locate the wheels on one side of the vehicle with respect to the other side from that point on. This is to say that the RCP transfer function is used to convert one camera's coordinate system into the other camera's coordinate system so that a target viewed by one camera can be directly related to a target viewed by the other camera.

The inspection process of the present invention is monocular, meaning that by using one camera in one position, the position and orientation of a target with respect to the camera can be determined. This, of course, requires that the target be in view of the camera to accomplish the measurement. But since one camera can only conveniently view one side of the vehicle at a time without using reflectors as earlier described above, two spatially related cameras must be used to view both sides. The RCP transfer function then allows the information obtained by the two cameras to be coordinated and have the same effect as if all of the information had been obtained by a single camera. An advantage of the use of such a system is that, since each wheel is independently inspected and merely related back to the others, the system is independent of level and does not require leveling of the vehicle support rack or floor. Moreover, it is not necessary that the axles of all wheels be at the same height, i.e., differences in tire sizes or inflation will not adversely affect measurement.

In operation, once the system has been calibrated using the calibration target 150 as illustrated in FIG. 9, a vehicle may be driven onto the rack 133, and, if desired, the vehicle lifted to an appropriate repair elevation. The target assemblies 126 are then attached to the wheel rims and manually oriented so that the target surfaces face the respective camera/light subsystems. The vehicle and model year are then entered into the keyboard 120 along with other relevant information which may include the vehicle VIN number, license number, owner name, etc. The system database includes specifications for each model that might be inspected, and upon identification of the particular vehicle under inspection extracts such information to assist in quickly locating the target images. Alternatively, previous inspection history can be used to indicate likely target location.

The targets are highly accurate and their position and orientation relative to the rim of the wheel to which they are attached is known to an accuracy of 0.01" and 0.001°. If each wheel was perfect and the clamp was perfectly mounted one could argue that the wheel axle would be normal (90° in all directions) to the wheel plane determined by the rim edge. However, since wheels are normally not perfect and targets are not always perfectly mounted, such information would only indicate orientation and position of the wheel plane and not necessarily provide accurate information as to the orientation of the wheel axis. Such assumption is thus not made. However, by rolling the wheel from one position to another a new image can be taken, and from the position and orientation of the target in the two positions, the actual position and orientation of the wheel axis can be calculated.

Similarly, to calculate the steering axle (about which the wheels turn when the steering wheel is turned) two target positions are again compared, one with the wheels turned to one side and one with the wheels turned to the other side. Calculation of the axis about which the targets must have been moved thus identifies the position and orientation of the steering axis.

Now knowing where each wheel axle is located and how it is oriented, where the steering axles are located and how they are oriented, the vehicle can be mathematically modeled in three dimensions, and the alignment values in toe, camber, caster, thrust angle, etc. can be displayed with respect to the vehicle itself.

Once the targets are installed on each wheel and the system is energized, enough information is available to generate an image such as that depicted in FIG. 2a. However, as pointed out above, because the rotational axis of the wheels may not be exactly normal to the wheel plane as defined by the outside perimeter of the rim to which the target assembly is attached, the system operator will be instructed to move the vehicle forward or aft 6 or 8 inches so as to rotate the wheels through about 30° of rotation With measurements taken of at least two different wheel positions, the system can optically obtain enough information to accurately determine true axle position and orientation for each wheel. Highly accurate computations can then be made and displayed on an updated screen, as depicted in FIG. 2a.

At this point, the actual operator alignment procedure can proceed, and since the inspection is continuous, the results of each adjustment will be reflected on the system video screen. In the preferred embodiment of the present invention, the operator can select various levels of assistance, including actual depictions of the location and parts to be adjusted to provide corrective action. Such information can even include the appropriate choice of tool to be used.

As pointed out above, since each camera is referenced to the other, it is not necessary that the supporting rack be level or even that all wheels lie within the same plane. However, although each wheel inspection is independent of the others, a reference plane must be identified. This can be accomplished by defining a reference plane that passes through the axles. But since one of the axles may not lie in the plane defined by the other three, some liberties must be taken. For example, for the purpose of aligning the front wheels, one might use the plane defined by the front axles and the average of the rear axles. A similar procedure might be used with respect to the rear wheels, etc. Wheel alignment would then be referenced to such a plane or planes. In addition, wheel position and thrust line measurements would also be referenced to such a plane or planes. Moreover, because of the independence of measurement, once a reference plane is defined, should one of the targets be blocked from view or become loose or even dislodged from a wheel, it will not necessarily affect measurements associated with other wheels.

Having now described several embodiments of the present invention suitable for use in aligning the wheels of a vehicle, and having pointed out that the position and orientation of each target and associated wheel may be determined independently of the other targets (and wheels), it will be appreciated by those skilled in the art that by modifying the target attachment structure to enable the targets to be affixed to other particular points on the vehicle, or to another type of structure, such as, for example, a building structure, an article of manufacture, a robot arm, or even territorial space, the same system can be used to measure relative spatial location or alignment of the several points to which the targets are affixed. For example, in the case of an automotive vehicle or the like, one might use the described system to measure vehicle chassis or body alignment, or perhaps ride height. And because the data is updated at a high rate, "jounce" measurements (i.e., a measurement of suspension dynamics) can be made. In the case of articles of manufacture, one might wish to embody a target in the form of a label and affix the label to parts on an assembly line, and then use the present invention to track the position and/or orientation of the article as it moves down the line. In the case of a robot arm, one or more targets affixed to various moving parts could be used to accurately follow the motion of the arm as objects are carried thereby. In the case of building structures, one might use a system in accordance with the present invention to determine or maintain alignment of various points on the structure relative to other points. In the case of territorial space, one might use the system to develop topological surveys of ground surface contours.

It will also be apparent that more than two cameras could be used to inspect objects or fields of view not readily inspectable with one or two cameras. In such case an RCP transfer function calibration procedure similar to that described above would be followed.

Figure 12:
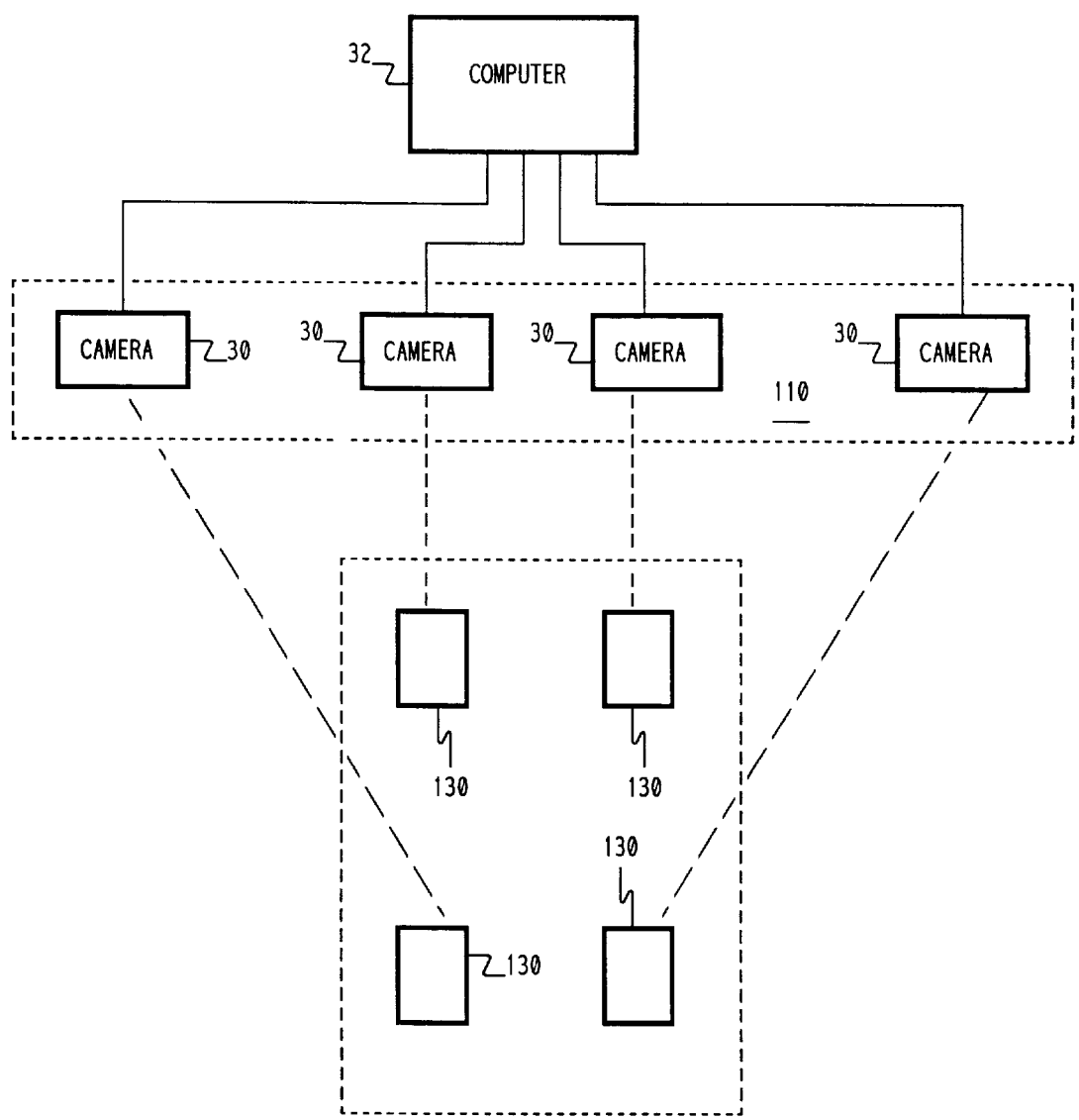
FIG. 12 is a block diagram representing an alternative embodiment of the invention.

FIG. 12 is a block representation of the use of more than two cameras as an alternative to the arrangement of FIG. 9, in which like elements are denoted by the same reference numerals.

Additional Features of the Invention

As indicated above, this invention can also be used to determine the condition of the shock absorbers of the vehicle. This is done by firstly "jouncing" the vehicle. Jouncing a vehicle is a normal step in alignment procedures, or, for that matter, checking the shock absorbers, and entails applying a single vertical force to the vehicle by, e.g. pushing down onto the hood of the vehicle and releasing the vehicle, to cause it to oscillate up and down. Secondly, as the vehicle oscillates up and down, the apparatus of the invention takes readings of the targets on each of the wheels. In so doing, the movement of the targets, which will define a dampened waveform, can be monitored to determine the extent of the dampening. If the dampening is not sufficient (i.e. the up and down movement or rocking of the vehicle does not stop soon enough) this indicates that the shock absorbers are faulty.

This method is particularly advantageous in that a determination can be made as to the soundness of a specific shock absorber; a result which can be indicated to the operator of the alignment apparatus by means of the computer 32.

It will be evident that in the determination of the condition of the shock absorbers of the vehicle, any suitable portion of the body of the motor vehicle can be selected to monitor the oscillation of the vehicle. So, for example, the apparatus can focus on the edge of the wheel housing or, alternatively, a small target placed on a convenient position on the body work of the motor vehicle.

In addition, this apparatus can be used to calculate the ride height of the motor vehicle. This parameter is particularly important in the determination of the alignment of the wheels of vehicles such as pick-ups which, in operation, may carry a load. This load would have the effect of lowering the vehicle and it is, therefore, preferable to make allowance for this during alignment procedures. Traditionally, the ride height, or height of the chassis of the vehicle from the floor, is determined by physically measuring it with an instrument such as a tape measure. This measurement is then compared to standard tables which yield a compensation factor for the vehicle concerned.

The method and apparatus of this invention can, however, make this measurement directly by viewing an appropriate portion of the body and determining its height from the test bed on which the vehicle rests. Once this height has been determined it can be compared to standard look-up tables stored within the computer which can, in turn, produce the compensation factor.

Advantages of the Invention

A general advantage of the apparatus of this invention is that it is relatively simple to use as no delicate mechanical or electronic equipment need be attached to the wheels of the motor vehicle concerned. As the sensitive and delicate equipment is mounted within a housing which stands independent and distant from the motor vehicle being tested, no damage can be caused to it if the motor vehicle were, for example, to be driven off the wheel guides. Whereas prior art heads can be knocked out of calibration by simple jarring or dropping, it takes major damage to the wheel-mounted components to affect the calculated results.

Another advantage is that the equipment requires very few operator commands and could readily be made hands free with simple auditory outputs and equally simple voice recognition means to receive and/or record operator responses and/or commands.

The present invention has the further advantage that alignment determinations can be done relatively quickly. This allows a higher turn around rate within the business conducting the alignment determinations.

Still further advantages of this apparatus is that it can be placed, as is illustrated in FIG. 4, above and out of the way of the motor vehicle being tested. This has the distinct advantage that the chances of damaging the sensitive alignment determining apparatus is substantially reduced as the apparatus is out of the way of the motor vehicle. Another advantage of this configuration is that the measuring apparatus uses minimal floor space and has no equipment blocking access to the front of the motor vehicle.

Furthermore, as the vehicle can be backed up and driven forward, this apparatus has the advantage that it is unnecessary to jack the vehicle up to make the required calculations for "run-out". In addition, this apparatus can be used to determine information other than the relative alignment of the wheels. For example, the alignment apparatus, if equipped with a suitable character recognition capability, could be used to read the license plate of the motor vehicle which could, in turn, yield information such as the make and model of the vehicle and its service history (if available) and, therefore, the required alignment parameters of such vehicle. This would save the operator from entering the motor vehicle's details into the apparatus. As more manufacturers are adding bar codes to the VIN number plates, similar information can also be obtained by optically viewing and processing the bar-coded plate. In addition, it would also be possible to optically identify the vehicle type by comparing certain features of the body or trim thereof to database information.

Yet another advantage of the invention is that no wires, cords or beams of light pass in front of the vehicle being tested. As most alignment correction is made by accessing the wheels of the car from the front, wires, cords or beams passing in front of the vehicle tend to get in the way of the technician. Often these wires, cords or beams are sensitive to being interfered with and so their absence makes alignment correction work much easier.

Related to this advantage is the fact that there are no cords or wires passing between the targets on the wheels, nor are there any wires supplying power to the targets from a remote power source. This absence of wires or cords once again makes work on the vehicle easier.

In addition, as the targets are not interlinked or interdependent, after initial capture of target images, it is possible to block off one of the targets from the camera's view without interfering with the orientation calculations for the other wheels. In the prior art devices described earlier, all the test heads are interdependent and cannot function if one of the heads is "blocked" out.

It will be evident to those skilled in the art that the concept of this invention can be applied in many different ways to determine the alignment of the wheels of a motor vehicle. So, for example, the apparatus could define a reference point for each wheel with the referent point being located at, say, the intersection of the axis of rotation of the wheel, with that wheel. These points can then be processed to define an approximately horizontal reference plane, relative to which the alignment of the wheels can be calculated.

This method has the particular advantage that the rack on which the vehicle is being supported does not have to be levelled, a process which requires expensive apparatus and which is necessary to define a horizontal reference plane and which is used in prior art alignment devices.

While the invention has been particularly shown and described with reference to certain preferred embodiments, it will be understood by those skilled in the art that various alterations and modifications in form and in detail may be made therein. Accordingly, it is intended that the following claims be interpreted as covering all such alterations and modifications as may fall within the true spirit and scope of the invention.

What is claimed is:

1. An apparatus for determining the alignment of motor vehicle wheels comprising:

target means including a plurality of target objects for attachment to wheels on respective first and second sides of a vehicle under inspection, each said target objects including a plurality of visually perceptible, geometrically configured target elements having known geometric characteristics and positional interrelationships;

optical inspection means defining a spatial reference system and including a plurality of cameras in excess of two, each of said plurality of cameras forming respective viewing paths intersecting said target objects when they are attached to wheels of a vehicle under inspection, each said camera being operable to inspect an image of a corresponding target object as viewed along its corresponding viewing path and to generate image information describing the geometric characteristics and positional interrelationships of the imaged target elements;

processing means for relating said image information to predetermined reference information describing the known geometric characteristics and positional interrelationships of said target elements and for determining the position and angular orientation of said plurality of target objects relative to said spatial reference system and generating position and orientation information commensurate therewith; and means responsive to the generated position and orientation information and operative to indicate the position and alignment of the wheels to which said plurality of targets are attached.

2. An apparatus as recited in claim 1 wherein said means responsive includes a display means which uses said orientation information to indicate the alignment of said plurality of wheels.

3. An apparatus as recited in claim 2 wherein the alignment of each said wheel is expressed in terms of caster, camber and toe measurements.

4. An apparatus as recited in claim 1 wherein said target means comprises four target objects for attachment respectively to four wheels of the vehicle an intersecting ones of said viewing paths.

5. An apparatus as recited in claim 4 wherein said processing means further determines the relative positions of said four wheels.

6. An apparatus as recited in claim 1 wherein said optical inspection means further includes lighting means associated with each camera means to provide on-axis target illumination therefor.

7. An apparatus as recited in claim 6 wherein said lighting means includes an array of light-emitting diodes arrayed around the optical axis of each said corresponding camera means.

8. An apparatus as recited in claim 7 wherein said light-emitting diodes are selected to have a particular wavelength characteristic and wherein wavelength-selective filter means are used to discriminate between diode light reflected from said target objects and light emanating from other sources.

9. An apparatus as recited in claim 1 wherein each said target object includes a planar plate having said plurality of target elements formed on a surface thereof and means for attaching the plate to a wheel of a vehicle under inspection.

10. An apparatus as recited in claim 9 wherein said means for attaching orients the plane of said surface substantially normal to the rim plane of the wheel to which the target object is attached.

11. An apparatus as recited in claims 1, wherein said target elements are formed of retro-reflective material.

12. An apparatus as recited in claim 1 wherein said target means includes clamps for clampingly engaging the rims of wheels.

13. An apparatus as recited in claim 1 and further comprising support means for supporting said plurality of cameras in fixed positions at predetermined separations from each other at a predetermined elevation.

14. A method of determining the relative orientation of the wheels of a vehicle comprising the steps of:

attaching a plurality of targets in excess of two on respective wheels of each side of said vehicle, each of said targets including a plurality of target elements of known geometric characteristics and positional interrelationships, said plurality of targets having predetermined positional relationships to the wheels to which they are attached;

using a plurality of cameras in excess of two, respectively, having known spatial positions and directional orientations, to view said targets and to form detected images thereof;

determining the geometric characteristics and positional interrelationships of the target elements of each of said detected images;

relating the determined geometric characteristics and positional interrelationships of said detected images to the known geometric characteristics and positional interrelationships of corresponding elements of the respective targets to determine the angular orientation of said targets; and using said angular orientations to determine the alignment of said wheels.

15. A method as recited in claim 14 and further including the step of relating the determined geometric characteristics and interrelationships of said detected images to the known geometric characteristics and interrelationships of corresponding elements of said targets to determine the positions of the axles of said wheels.

16. An apparatus for determining the alignment of motor vehicle wheels comprising:

a plurality of targets each including a first plurality of known geometric attributes with known spatial interrelationships;

optical inspection means establishing a spatial reference system including a plurality of viewing paths respectively intersecting said targets when attached respectively to a plurality of wheels of a vehicle under inspection, said plurality of viewing paths being greater than two, said optical inspection means being operable to inspect images of said targets as viewed along said respective viewing paths and to generate image information describing the geometric attributes and interrelationships of the images;

processing means for relating said image information to predetermined reference information describing the known geometric attributes and relationships of said targets to determine the angular orientation of said targets relative to said spatial reference system and to generate orientation information commensurate therewith; and means for using said orientation information to indicate the alignment of said wheels.

17. An apparatus as recited in claim 16, wherein said processing means is further operative to determine the spatial positions of three of said wheels, the said positions defining a reference plane relative to which the alignment of the wheels can be calculated.

18. An apparatus as recited in claim 16 wherein said images are viewed with said wheels in first positions, and wherein said optical image inspection means is further operable to inspect other images of said targets after said wheels have been rotated about their axes to second positions, and to generate additional image information describing the geometric attributes and interrelationships of the targets as they appear in said other images, and wherein said processing means is further operable to relate said additional image information to the original image information to determine the relationships of said targets to the axes of rotation of said wheels.

19. An apparatus for determining the position and orientation of an object comprising:

means defining at least three targets associated with the object and having separate determinable relationships to the object, each said target including a plurality of known detectable attributes having known interrelationships;

imaging means for viewing said targets each along a separate respective viewing path and for developing electronic signals representation of each viewed image of the targets;

computational means having information stored therein defining the known attributes and interrelationships of each target, and responsive to said electronic signals, and operative to relate said electronic signals to the stored information and to determine the orientation of each target relative to its viewing path; and means for using said determined orientation of each target to determine the position and orientation of the object.

20. An apparatus for determining the relative alignment of a plurality of components comprising:

a plurality of targets each including a plurality of target objects, each target object having a plurality of known detectable attributes with known geometries and spatial interrelationships, each said target being adapted for attachment to one of said components;

optical inspection means establishing a spatial reference system including more than two viewing paths, each of which intersects one of said targets when the targets are attached to said components, said optical inspection means being operable to inspect an image of each target object as viewed along its corresponding viewing path and to generate image information describing the attributes and interrelationships of each image;

processing means for relating the image information corresponding to each target object to predetermined reference information describing the known attributes and relationships of each said target object to determine the angular orientation of each said target object relative to said spatial reference system and to generate first orientation information commensurate therewith; and indicator means for using said orientation information to indicate the alignment of each said component.

21. An apparatus as recited in claim 20 wherein said indicator means further uses said orientation information to indicate the position of each component.

22. An apparatus as recited in claim 21 wherein said optical inspection means includes a video camera for each of the more than two viewing paths and lighting means for providing on-axis illumination for said cameras.

23. An apparatus as recited in claim 22 wherein said detectable attributes are embodied as geometrical shapes formed by a body of retro-reflective material.

24. A method for determining the relative alignment of at least three components of an object, comprising the steps of:

establishing at least one target on each component of the object such that each target has a determinable relationship to the component and wherein each target includes a plurality of known detectable attributes having known geometric characteristics and interrelationships;

viewing each target along a corresponding viewing path to form at least one detected image of each target;

determining the geometric characteristics and interrelationships of at least two attributes of each detected image;

relating the determined characteristics and interrelationships of the attributes of each detected image to the known geometric characteristics and interrelationships of corresponding attributes of a corresponding target to determine the angular orientation of each target relative to a corresponding viewing path; and using said angular orientations and said determinable relationships to determine the relative alignment of the components of said object.

\* \* \* \* \*